US012571987B2

(12) United States Patent
Huh et al.

(10) Patent No.: US 12,571,987 B2
(45) Date of Patent: Mar. 10, 2026

(54) IMAGING LENS SYSTEM

(71) Applicant: SAMSUNG ELECTRO-MECHANICS CO., LTD., Suwon-si (KR)

(72) Inventors: Jae Hyuk Huh, Suwon-si (KR); You Jin Jeong, Suwon-si (KR); So Mi Yang, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 12 days.

(21) Appl. No.: 18/362,286

(22) Filed: Jul. 31, 2023

(65) Prior Publication Data

US 2024/0176104 A1     May 30, 2024

(30) Foreign Application Priority Data

Nov. 24, 2022   (KR) ........................ 10-2022-0159541
Mar. 21, 2023   (KR) ........................ 10-2023-0036426

(51) Int. Cl.
  *G02B 9/34*     (2006.01)
  *G02B 13/00*    (2006.01)
(52) U.S. Cl.
  CPC ............. *G02B 9/34* (2013.01); *G02B 13/004* (2013.01); *G02B 13/0065* (2013.01)
(58) Field of Classification Search
  CPC ..... G02B 9/34; G02B 13/004; G02B 13/0065
  See application file for complete search history.

(56) References Cited

U.S. PATENT DOCUMENTS

| 2018/0267271 A1 | 9/2018 | Tseng et al. |
| 2019/0324233 A1 | 10/2019 | Chen |
| 2021/0063686 A1 | 3/2021 | Kim et al. |
| 2021/0063687 A1 | 3/2021 | Huh et al. |
| 2021/0165192 A1 | 6/2021 | Shabtay et al. |
| 2021/0333515 A1 | 10/2021 | Li et al. |
| 2022/0091373 A1 | 3/2022 | Saiga et al. |
| 2022/0196992 A1 | 6/2022 | Kim et al. |
| 2022/0229271 A1 | 7/2022 | Tseng et al. |

(Continued)

FOREIGN PATENT DOCUMENTS

| CN | 110208927 A | | 9/2019 | |
| CN | 112698501 A | * | 4/2021 | ........... G02B 13/004 |

(Continued)

OTHER PUBLICATIONS

WO-2022160120-A1, translation (Year: 2022).*

(Continued)

*Primary Examiner* — Wen Huang
(74) *Attorney, Agent, or Firm* — NSIP Law

(57) ABSTRACT
An imaging lens system is provided. The imaging lens system includes a lens group including a plurality of lenses; and an optical path conversion member disposed between the lens group and an imaging plane. The lens group may include a first lens, a second lens, a third lens, and a fourth lens sequentially disposed from an object side toward the imaging plane. The optical path conversion member may reflect light emitted from the lens group two or more times to increase a rear focal length of the lens group (or a distance from an image-side surface of a lens disposed on a rearmost side of the lens group to the imaging plane).

6 Claims, 10 Drawing Sheets

(56) References Cited

U.S. PATENT DOCUMENTS

| | | | |
|---|---|---|---|
| 2022/0244495 A1 | 8/2022 | Yeh et al. | |
| 2022/0326480 A1 | 10/2022 | Kim et al. | |
| 2023/0324656 A1* | 10/2023 | Tsai | G03B 17/17 |
| | | | 359/833 |
| 2023/0375808 A1* | 11/2023 | Huang | G02B 9/60 |
| 2024/0126045 A1* | 4/2024 | Yeh | G02B 13/004 |
| 2024/0168261 A1* | 5/2024 | Tseng | G02B 13/004 |

FOREIGN PATENT DOCUMENTS

| | | |
|---|---|---|
| CN | 114815164 A | 7/2022 |
| KR | 10-2021-0027185 A | 3/2021 |
| KR | 10-2022-0138778 A | 10/2022 |
| TW | 202109119 A | 3/2021 |
| TW | 202119076 A | 5/2021 |
| TW | 202223483 A | 6/2022 |
| WO | WO-2022160120 A1 * | 8/2022 |

OTHER PUBLICATIONS

CN-112698501-A, translation (Year: 2021).*
Korean Office Action issued on Oct. 26, 2023, in counterpart Korean Patent Application No. 10-2023-0036426 (6 pages in English, 5 pages in Korean).
Taiwanese Office Action issued on Feb. 5, 2024, in counterpart Taiwanese Patent Application No. 112130229 (5 pages in English, 4 pages in Chinese).
Taiwanese Office Action issued on Oct. 15, 2024, in counterpart Taiwanese Patent Application No. 113124560 (5 pages in English, 4 pages in Chinese).
Taiwanese Office Action Issued on Jun. 10, 2025, in Counterpart Taiwanese Patent Application No. 113124560 (7 Pages in English, 6 Pages in Chinese).

* cited by examiner

LONGITUDINAL
SPHERICAL ABER.

ASTIGMATIC
FIELD CURVES

DISTORTION 650.0000 NM
610.0000 NM
555.0000 NM
510.0000 NM
470.0000 NM

IMG HT

IMG HT

FOCUS (MILLIMETERS)

FOCUS (MILLIMETERS)

% DISTORTION

IMAGING LENS SYSTEM

CROSS-REFERENCE TO RELATED APPLICATIONS

This application claims priority under 35 USC § 119(a) to Korean Patent Application Nos. 10-2022-0159541 filed on Nov. 24, 2022 and 10-2023-0036426 filed on Mar. 21, 2023 in the Korean Intellectual Property Office, the disclosures of which are incorporated herein by reference for all purposes.

BACKGROUND

1. Field

The following description relates to a telephoto imaging lens system.

2. Description of Related Art

It may be difficult for an imaging lens system (for example, a telephoto imaging lens system) having a long focal length to have a small thickness and a miniature size, and it may thus be difficult for the system to be mounted in a small terminal. However, there is an increased demand for operational improvement and performance improvement of the small terminal, for example, a smartphone, which results in an increased need to mount the telephoto imaging lens system in the small terminal.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, an imaging lens system includes a first lens, a second lens, a third lens, a fourth lens, and an optical path conversion member sequentially disposed from an object side toward an imaging plane, wherein $0.70 < PL/TTL < 0.90$, where PL is a distance from an incident surface of the optical path conversion member to an exit surface of the optical path conversion member, and TTL is a distance from an object-side surface of the first lens to the imaging plane.

The first lens may have a convex object-side surface.
The first lens may have a convex image-side surface.
The second lens may have a concave object-side surface.
The second lens may have a concave image-side surface.
The third lens may have a convex object-side surface.
The third lens may have a concave image-side surface.
The fourth lens may have a convex image-side surface.
The fourth lens may have a concave image-side surface.

In a general aspect, an imaging lens system includes a first lens, a second lens, a third lens, a fourth lens, and an optical path conversion member sequentially disposed from an object side toward an imaging plane, wherein $0.80 < f/PL < 1.20$, where PL is a distance from an incident surface of the optical path conversion member to an exit surface of the optical path conversion member, and f is a focal length of the imaging lens system.

The first lens may have a positive refractive power.
$3.0 < f \text{ number} < 5.0$.
$1.60 < f/f1 < 3.20$, where f1 is a focal length of the first lens.

$1.0 < TTL/f < 1.40$, where TTL is a distance from an object-side surface of the first lens to the imaging plane.
$0.4 < (R1+R8)/PL < 0.6$, where R1 is a radius of curvature of an object-side surface of the first lens and R8 is a radius of curvature of an image-side surface of the fourth lens.
$0.10 < ImgHT/PL < 0.18$, where ImgHT is a height of the imaging plane.

The second lens may have a positive refractive power.

Other features and aspects will be apparent from the following detailed description, the drawings, and the claims.

Figures 1, 2:
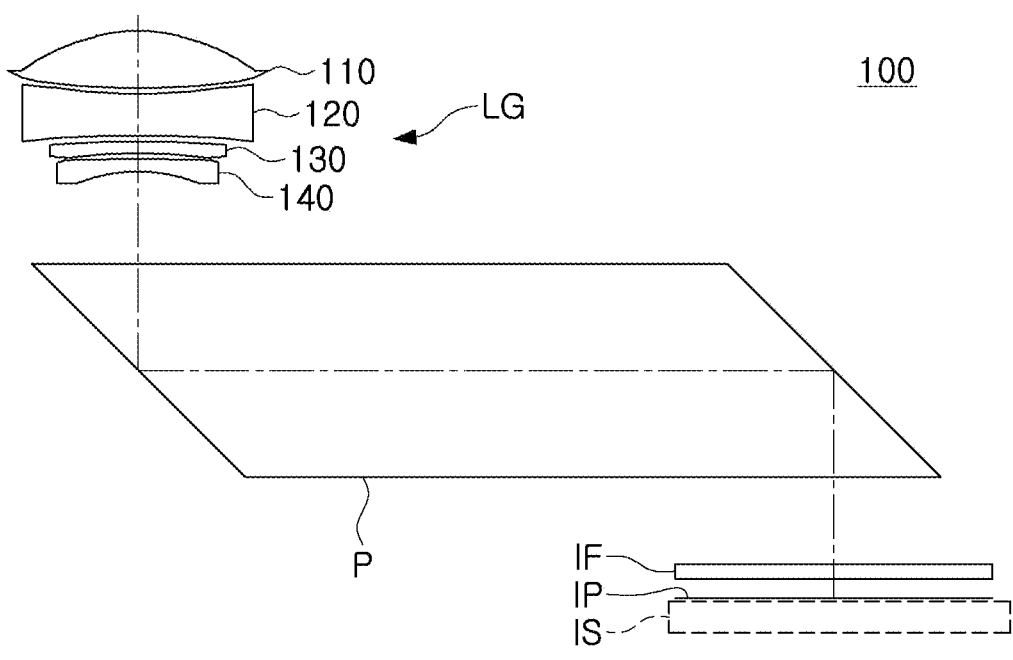
FIG. 1 illustrates a configuration diagram of an example imaging lens system, in accordance with one or more embodiments.
FIG. 2 illustrates an aberration curve of the example imaging lens system shown in FIG. 1.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment, e.g., as to what an example or embodiment may include or implement, means that at least one example or embodiment exists where such a feature is included or implemented, while all examples are not limited thereto. The use of the terms "example" or "embodiment" herein have a same meaning, e.g., the phrasing "in one example" has a same meaning as "in one embodiment", and "one or more examples" has a same meaning as "in one or more embodiments."

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

Throughout the specification, when a component or element is described as being "on", "connected to," "coupled to," or "joined to" another component, element, or layer it may be directly (e.g., in contact with the other component, element, or layer) "on", "connected to," "coupled to," or "joined to" the other component, element, or layer or there may reasonably be one or more other components, elements, layers intervening therebetween. When a component, element, or layer is described as being "directly on", "directly connected to," "directly coupled to," or "directly joined" to another component, element, or layer there can be no other components, elements, or layers intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

Unless otherwise defined, all terms, including technical and scientific terms, used herein have the same meaning as commonly understood by one of ordinary skill in the art to which this disclosure pertains and specifically in the context on an understanding of the disclosure of the present application. Terms, such as those defined in commonly used dictionaries, are to be interpreted as having a meaning that is consistent with their meaning in the context of the relevant art and specifically in the context of the disclosure of the present application, and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

In an example, the telephoto imaging lens system may be mounted in a portable electronic device.

One or more examples may provide a telephoto imaging lens system which has a long focal length and may be mounted in a small terminal.

In the one or more examples, a first lens may indicate a lens closest to an object (or a subject). Additionally, the number of lenses may indicate an order in which the lenses are disposed from an object side to an imaging plane in an optical axis direction. For example, a second lens may indicate a lens disposed second from the object side, and the third lens may indicate a lens disposed third from the object side. In the one or more examples, a radius of curvature of a lens, a thickness, a distance TTL from an object-side surface of the first lens to an imaging plane, a height ImgHT of the imaging plane, and a focal length are represented by millimeters (mm).

Each of the thickness of the lens, a distance between the lenses, the TTL and an incidence angle may be a dimension calculated based on an optical axis of the imaging lens system. Further, in a description for a shape of the lens, a convex surface of the lens may indicate that a paraxial region of a corresponding surface is convex, and a concave surface of the lens may indicate that the paraxial region of a corresponding surface is concave. Therefore, although the one or more examples may describe that one surface of the lens is convex, an edge portion of the lens may be concave. Likewise, although one or more examples may describe that a surface of the lens is concave, the edge portion of the lens may be convex.

In an example, the imaging lens system described herein may be mounted in a portable electronic device. For example, the imaging lens system may be mounted in, as only examples, a smartphone (or a portable terminal), a laptop computer, an augmented reality device, a virtual reality (VR) device, a portable game machine, or the like. However, the usage range and usage example of the imaging lens system described herein may not be limited to the electronic device described above. In an example, the imaging lens system may be applied to an electronic device which may need high-resolution imaging while providing a narrow mounting space.

The imaging lens system described herein may reduce an external size of the imaging lens system while securing a long rear focal length BFL (or a distance from an image-side surface of the rearmost lens to the imaging plane. In an example, the imaging lens system described herein may reduce the external size of the imaging lens system while securing the BFL desired to implement a telephoto imaging lens system by using a reflecting member. In another example, the imaging lens system described herein may provide an imaging plane having a considerable size for implementation of high resolution. In yet another example, the imaging lens system described herein may have an integrated form to be mounted in the portable terminal while securing the long focal length or the long BFL.

In the one or more examples, an optical path conversion member may refer to any member which may allow light to be reflected. In an example, the optical path conversion member may collectively refer to a reflector, a prism, and the like, as only examples. Therefore, in the one or more examples, the reflector, the prism, and the optical path conversion member may all refer to the same component or interchangeable components.

An imaging lens system according to a first aspect of the present disclosure may include a lens group and an optical path conversion member. In the imaging lens system according to a first aspect, the lens group may include a plurality of lenses. In an example, the lens group may include a first lens, a second lens, a third lens, and a fourth lens sequentially disposed from the object side to the imaging plane. In the imaging lens system according to a first aspect, the optical path conversion member may include a plurality of reflective surfaces. In a non-limiting example, the optical path conversion member may include two reflective surfaces. As a specific example, the optical path conversion member may include a first reflective surface and a second reflective surface. The optical path conversion member may include a pair of incident surfaces and exit surfaces. The incident surface may be disposed closest to the lens group, and the exit surface may be disposed closest to the imaging plane.

An imaging lens system according to a second aspect of the present disclosure may include a lens group and an optical path conversion member. In the imaging lens system according to a second aspect, the lens group may include a plurality of lenses. In an example, the lens group may include a first lens, a second lens, a third lens, and a fourth lens sequentially disposed from the object side to the imaging plane. In the imaging lens system according to a second aspect, the optical path conversion member may include a plurality of reflective surfaces substantially parallel to each other. For example, the first reflective surface and second reflective surface of the optical path conversion member may be parallel to each other.

An imaging lens system according to a third aspect of the present disclosure may include a lens group and an optical path conversion member. In the imaging lens system according to a third aspect, the lens group may include a plurality of lenses. In an example, the lens group may include a first lens, a second lens, a third lens, and a fourth lens sequentially disposed from the object side to the imaging plane. In the imaging lens system according to a third aspect, the optical path conversion member may include the incident surfaces and exit surfaces substantially parallel to each other. In an example, the incident surfaces and exit surfaces of the optical path conversion member may be parallel to each other. In the imaging lens system according to a third aspect, the optical path conversion member may include a plurality of reflective surfaces. For example, the optical path conversion member may include two reflective surfaces disposed between the incident surface and the exit surface.

An imaging lens system according to a fourth aspect of the present disclosure may include a lens group and an optical path conversion member. The lens group and the optical path conversion member may be sequentially disposed from the object side to the imaging plane. In other words, the optical path conversion member may be disposed between the lens group and the imaging plane or on an image side of the rearmost lens in the lens group. In the imaging lens system according to a fourth aspect, the lens group may include a plurality of lenses. For example, the lens group may include a first lens, a second lens, a third lens, and a fourth lens sequentially disposed from the object side to the imaging plane. In the imaging lens system according to a fourth aspect, the optical path conversion member may include a pair of incident surfaces and exit surfaces. The incident surface may be disposed closest to the lens group, and the exit surface may be disposed closest to the imaging plane. The imaging lens system according to a fourth aspect may satisfy a unique conditional expression. For example, the imaging lens system according to a fourth aspect may satisfy the following conditional expression: $0.7<PL/TTL<0.9$. For reference, in the conditional expression, TTL is a distance from an object-side surface of the forwardmost lens (or first lens) in the lens group to the imaging plane, and PL is a distance from the incident surface to the exit surface of the optical path conversion member (based on an optical path).

An imaging lens system according to a fifth aspect of the present disclosure may include a first lens, a second lens, a third lens, a fourth lens, and an optical path conversion member sequentially disposed from the object side to the imaging plane. In the imaging lens system according to a fifth aspect, the optical path conversion member may include a pair of incident surfaces and exit surfaces. The incident surface may be disposed closest to the fourth lens, and the exit surface may be disposed closest to the imaging plane. The imaging lens system according to a fifth aspect may satisfy a unique conditional expression. For example, the imaging lens system according to a fifth aspect may satisfy the following conditional expression: $0.8<f/PL<1.2$.

For reference, in the conditional expression, f is a focal length of the imaging lens system.

The imaging lens system according to a sixth aspect of the present disclosure may satisfy one or more of the following conditional expressions. However, only the imaging lens system according to a sixth aspect may not satisfy the following conditional expressions. For example, the imaging lens systems according to a first aspect to a fifth aspect described above and a seventh aspect or an eighth aspect, described below, may satisfy one or more of the following conditional expressions:

$$3.0 < f\text{ number} < 5.0$$

$$1.6 < f/f1 < 3.2$$

$$16\text{ mm} < f$$

$$1.0 < TTL/f < 1.4$$

$$0.7 < PL/TTL < 0.9.$$

In the conditional expressions, f is a focal length of the imaging lens system, f1 is a focal length of the forwardmost lens (or first lens) in the lens group, TTL is a distance from an object-side surface of the forwardmost lens (or first lens) in the lens group to the imaging plane, and PL is a distance from the incident surface to the exit surface of the optical path conversion member (based on the optical path).

The imaging lens system according to a seventh aspect of the present disclosure may satisfy one or more of the following conditional expressions. However, only the imaging lens system according to a seventh aspect may not satisfy the following conditional expressions. For example, the imaging lens systems according to a first aspect to a sixth aspect described above and a ninth aspect described below may satisfy one or more of the following conditional expressions:

$$16\text{ mm} < PL$$

$$11\text{ mm} < PD12$$

$$0.61 < PD12/f < 0.68.$$

In the conditional expressions, PD12 is a distance from the first reflective surface to second reflective surface of the optical path conversion member (alternatively, a distance from a reflective surface of the optical path conversion member that is closest to the rearmost lens in the lens group to a reflective surface of the optical path conversion member that is closest to the imaging plane).

The imaging lens system according to an eighth aspect of the present disclosure may satisfy one or more of the following conditional expressions. However, only the imaging lens system according to an eighth aspect may not satisfy the following conditional expressions. For example, the imaging lens system according to a first aspect to a seventh aspect described above may satisfy one or more of the following conditional expressions:

$$0.8 < f/PL < 1.2$$

$$0.70 < (|f1| + |f4|)/PL < 2.4$$

$$1.8 < (|f3| + |f4|)/PL < 6.0$$

$$2.0 < (|f1| + |f3| + |f4|)/PL < 6.2$$

$$0.30 < |f4/PL| < 2.0$$

$$0.10 < |R7/PL| < 3.0$$

$$0.10 < |R8/PL| < 1.0$$

$$0.40 < (R1 + R8)/PL < 0.60$$

$$0.10 < TL14/PL < 0.30$$

$$0.10 < \text{ImgHT}/PL < 0.18$$

$$2.10 < (TTL + \text{ImgHT})/PL < 2.60$$

$$1.20 < (TTL + f)/PL < 1.60.$$

In the conditional expression, f1 is a focal length of the first lens, f3 is a focal length of the third lens, f4 is a focal length of the fourth lens, R1 is a radius of curvature of the object-side surface of the first lens, R7 is a radius of curvature of an object-side surface of the fourth lens, R8 is a radius of curvature of an image-side surface of the fourth lens, TL14 is a distance from the object-side surface of the first lens to the image-side surface of the fourth lens, and ImgHT is a height of the imaging plane.

The imaging lens systems according to a first aspect to an eighth aspect may include one or more lenses having the following characteristics, if necessary. For example, the imaging lens system according to a first aspect may include one of the first to fourth lenses having the following characteristics. In another example, the imaging lens system according to a second aspect may include two or more of the first to fourth lenses having the following characteristics. However, the imaging lens system according to the above-described aspect may not necessarily include the lens having the following characteristics.

The first lens may have a refractive power. For example, the first lens may have a positive refractive power. The first lens may have a convex surface. For example, the first lens may have a convex object-side surface. The first lens may have a predetermined refractive index. For example, a refractive index of the first lens may be 1.4 or more. As a specific example, the refractive index of the first lens may be greater than 1.4 and less than 1.6. The first lens may have a predetermined Abbe number. For example, the Abbe number of the first lens may be 50 or more. As a specific example, the Abbe number of the first lens may be greater than 50 and less than 90. The first lens may have a predetermined focal length. For example, the focal length of the first lens may be determined in a range of 5.0 mm to 12.0 mm.

The second lens may have a refractive power in its paraxial region or edge region. For example, the second lens may have a positive or a negative refractive power in the paraxial region. In another example, the second lens may have a positive or negative refractive power in the edge region (in this example, the object-side surface and the image-side surface of the second lens may be substantially flat (only in the paraxial region)). The second lens may have a concave surface or a flat surface. For example, the second lens may have a concave image-side surface. In another example, the second lens may have a flat image-side surface. The second lens may have a predetermined refractive index. For example, the refractive index of the second lens may be 1.5 or more. As a specific example, the refractive index of the second lens may be greater than 1.5 and less than 1.7. The second lens may have a predetermined Abbe number. For example, the Abbe number of the second lens may be 20 or more.

The third lens may have a refractive power. For example, the third lens may have a positive or a negative refractive power. The third lens may have a convex surface. For example, the third lens may have a convex object-side surface. The third lens may have a predetermined refractive index. For example, the refractive index of the third lens may be 1.5 or more. As a specific example, the refractive index of the third lens may be greater than 1.5 and less than 1.70. The third lens may have a predetermined Abbe number.

The fourth lens may have a refractive power. For example, the fourth lens may have a positive or a negative refractive power. The fourth lens may have a convex surface. For example, the fourth lens may have a convex object-side surface. The fourth lens may have a predetermined refractive index. For example, the refractive index of the fourth lens may be 1.5 or more. As a specific example, the refractive index of the fourth lens may be greater than 1.5 and less than 1.7.

Aspherical surfaces of the first to fourth lenses may be expressed by Equation 1. In the Equation 1, c is an inverse of a radius of curvature of the corresponding lens, k is a conic constant, r is a distance from an arbitrary point on an aspherical surface of the lens to the optical axis, A to J indicate aspherical constants, and Z (or SAG) is a height in the optical axis direction from the arbitrary point on the aspheric surface to an apex of the aspheric surface.

$$z = \frac{cr^2}{1+\sqrt{1-(1+k)c^2r^2}} + Ar^4 + Br^6 + \qquad \text{Equation 1}$$
$$Cr^8 + Dr^{10} + Er^{12} + Fr^{14} + Gr^{16} + Hr^{18} + Jr^{20} \ldots$$

An electronic device according to a first aspect of the present disclosure may have a thin form factor in order to be easily carried or stored. For example, the electronic device according to an aspect may be, as only examples, a smartphone, a laptop computer, or the like. The electronic device according to an aspect may include a camera module having a long focal length while implementing a high resolution. For example, the electronic device may be equipped with a camera module including one of the imaging lens systems according to a first aspect to a fifth aspect described above. However, the imaging lens system included in the camera module may not be limited to the imaging lens systems according to a first aspect to a fifth aspect, described above.

Hereinafter, one or more examples will now be described in detail with reference to the accompanying drawings.

An example imaging lens system according to a first embodiment will be described with reference to FIG. 1.

An imaging lens system 100, in accordance with a first embodiment, may include a lens group LG and a prism P, which is one type of the optical path conversion member. However, components of the imaging lens system 100 are not limited to the above-mentioned members. For example, the imaging lens system 100 may further include a filter IF and an imaging plane IP. The lens group LG and the prism P may be sequentially disposed from the object side to the imaging plane. In an example, the lens group LG may be disposed on an object side of the prism P, and the prism P may be disposed between the lens group LG and the imaging plane IP.

Next, the above-mentioned components are described in order.

The lens group LG may include a plurality of lenses. For example, the lens group LG may include a first lens 110, a second lens 120, a third lens 130, and a fourth lens 140 sequentially disposed from the object side to the imaging plane. The first lens 110 to the fourth lens 140 may be disposed at a predetermined interval. For example, an image-side surface of the first lens 110 may not be in contact with an object-side surface of the second lens 120, and an image-side surface of the second lens 120 may not be in contact with an object-side surface of the third lens 130. However, this is only an example, and the first lens 110 to the fourth lens 140 may not be necessarily disposed spatially separate from each other. For example, the image-side surface of the first lens 110 may be in contact with the object-side surface of the second lens 120, and the image-side surface of the second lens 120 may be in contact with the object-side surface of the third lens 130.

Next, characteristics of the first lens 110 to the fourth lens 140 will be described.

The first lens 110 may have a positive refractive power, and may have a convex object-side surface and a convex image-side surface. The second lens 120 may have a negative refractive power, and may have a concave object-side surface and a concave image-side surface. The third lens 130 may have a positive refractive power, and may have a convex object-side surface and a concave image-side surface. The fourth lens 140 may have a negative refractive power, and may have a convex object-side surface and a concave image-side surface.

Next, the prism P which is the optical path conversion member will be described. For reference, the prism described below may be one type of the optical path conversion member described in the claims, and may be changed to another member.

The prism P may include a plurality of reflective surfaces. For example, the prism P may include a first reflective surface and a second reflective surface. In an example, the first reflective surface and the second reflective surface may be substantially parallel to each other. The first reflective surface and the second reflective surface may have a considerable distance therebetween. In an example, the distance from the first reflective surface to the second reflective surface may be greater than the height ImgHT of the imaging plane. In another example, the distance from the first reflective surface to the second reflective surface may be greater than four times the height ImgHT of the imaging plane.

The filter IF and the imaging plane IP may be disposed adjacent to the exit surface of the prism P.

The filter IF may block light of a specific wavelength. For example, the filter IF in accordance with one or more embodiments may block infrared light. However, a type of light blocked by the filter IF is not limited to the infrared light. In an example, the filter IF may block ultraviolet or visible light.

The imaging plane IP may be disposed at a point where light reflected from the prism P converges or forms an image, and may be formed by an image sensor IS or the like. In an example, the imaging plane IP may be formed on, or inside, the image sensor IS.

The imaging lens system 100 configured as above may show aberration characteristics illustrated in FIG. 2. Tables 1 and 2 below each show the lens characteristics and aspherical value of the imaging lens system according to a first embodiment.

TABLE 1

| Surface no. | Component | Radius of curvature | Thickness/ Distance | Refractive index | Abbe number |
|---|---|---|---|---|---|
| S1 | First lens | 4.011 | 1.199 | 1.537 | 55.7 |
| S2 | | −14.850 | 0.100 | | |
| S3 | Second lens | −12.671 | 0.897 | 1.537 | 55.7 |
| S4 | | 61.237 | 0.100 | | |
| S5 | Third lens | 8.7443 | 0.281 | 1.619 | 26.0 |
| S6 | | 14.0998 | 0.090 | | |
| S7 | Fourth lens | 13.9517 | 0.300 | 1.619 | 26.0 |
| S8 | | 3.61527 | 1.000 | | |
| S9 | Prism | Infinity | 2.500 | 1.518 | 64.2 |
| S10 | | Infinity | 11.500 | 1.518 | 64.2 |
| S11 | | Infinity | 3.000 | 1.518 | 64.2 |
| S12 | | Infinity | 0.300 | | |
| S13 | Filter | Infinity | 0.210 | 1.518 | 64.2 |
| S14 | | Infinity | 0.293 | | |
| S15 | Imaging plane | Infinity | −0.005 | | |

TABLE 2

| Surface no. | S1 | S2 | S3 | S4 |
|---|---|---|---|---|
| K | 0.30586731 | 0 | 0 | −99 |
| A | 0.000114755 | −4.81514E−06 | 1.04971E−05 | −0.00535105 |
| B | 0.000208012 | −1.04458E−05 | 1.20121E−05 | 0.015500874 |
| C | −8.7875E−05 | −3.6683E−06 | 3.91821E−06 | −0.014744057 |
| D | 3.51492E−05 | −6.49696E−07 | 6.38338E−07 | 0.007996377 |
| E | −7.22531E−06 | −6.98204E−08 | 4.96136E−08 | −0.002590475 |
| F | 4.99905E−07 | −5.19109E−09 | 3.47792E−09 | 0.000521509 |
| G | −1.51175E−08 | −1.01115E−09 | 4.31772E−09 | −6.32416E−05 |
| H | 2.22107E−08 | −3.82281E−10 | 2.51807E−09 | 3.05144E−06 |
| J | −4.16492E−09 | −8.20259E−11 | 8.6914E−10 | 1.60515E−07 |

| Surface no. | S5 | S6 | S7 | S8 |
|---|---|---|---|---|
| K | −1.22E+01 | 0 | 0 | 5.041E−01 |
| A | −9.385E−03 | −1.23575E−06 | 6.36505E−06 | −5.891E−03 |
| B | 1.135E−02 | 2.71877E−06 | 3.07787E−07 | −6.522E−03 |
| C | −5.468E−03 | 1.99257E−06 | −7.9286E−08 | 2.329E−02 |
| D | −3.361E−03 | 8.0273E−07 | 4.64235E−07 | −3.660E−02 |
| E | 0.005087576 | 2.04287E−07 | 5.92816E−07 | 0.031228163 |
| F | −0.002454902 | −3.82374E−09 | 4.76409E−07 | −0.015410434 |
| G | 0.000585915 | −9.22089E−09 | 3.20714E−07 | 0.004374527 |
| H | −6.96614E−05 | −8.74308E−09 | 1.67602E−08 | −0.000659447 |
| J | 3.29147E−06 | −5.74533E−09 | 1.0781E−08 | 4.07033E−05 |

Figure 3:
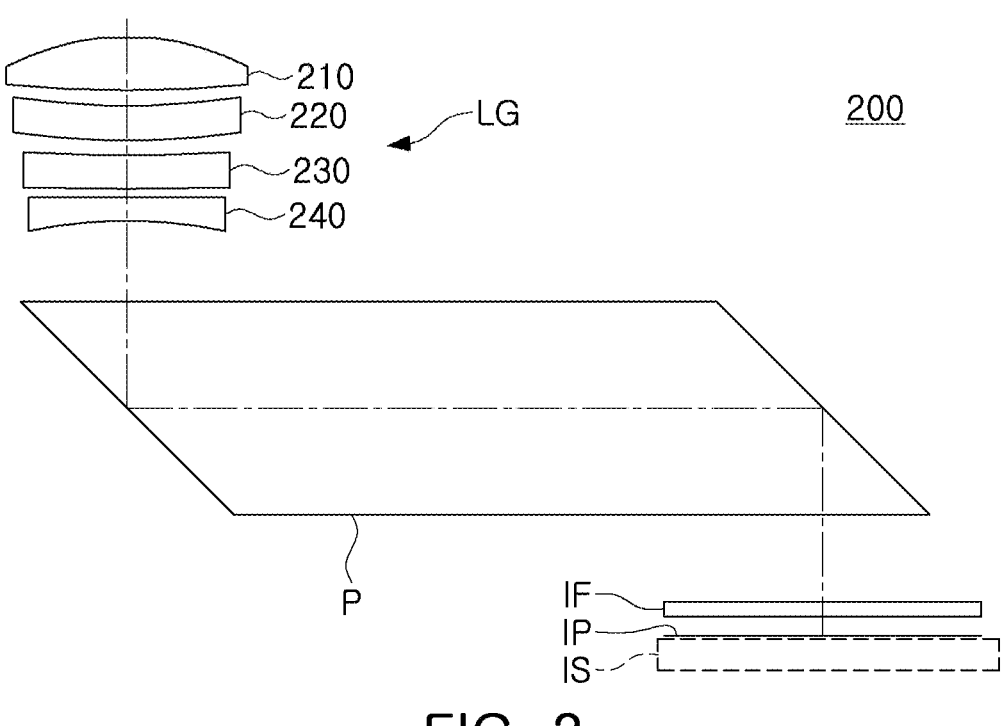
FIG. 3 illustrates a configuration diagram of an example imaging lens system, in accordance with one or more embodiments.

An example imaging lens system, according to a second embodiment, will be described with reference to FIG. 3.

An example imaging lens system 200, in accordance with a second embodiment, may include a lens group LG and a prism P, which is a type of the optical path conversion member. However, components of the imaging lens system 200 are not limited to the above-mentioned members. In an example, the imaging lens system 200 may further include a filter IF and an imaging plane IP. The lens group LG and the prism P may be sequentially disposed from the object side to the imaging plane. In an example, the lens group LG may be disposed on an object side of the prism P, and the prism P may be disposed between the lens group LG and the imaging plane IP.

Next, the above-mentioned components are described in order.

The lens group LG may include a plurality of lenses. In an example, the lens group LG may include a first lens 210, a second lens 220, a third lens 230, and a fourth lens 240 sequentially disposed from the object side to the imaging plane. In an example, the first lens 210 to the fourth lens 240 may be disposed at a predetermined interval. In a non-limited example, an image-side surface of the first lens 210 may not be in contact with an object-side surface of the second lens 220, and an image-side surface of the second lens 220 may not be in contact with an object-side surface of the third lens 230. However, this is only an example, and the first lens 210 to the fourth lens 240 may not be necessarily disposed spatially separate from each other. For example, the image-side surface of the first lens 210 may be in contact with the object-side surface of the second lens 220, and the image-side surface of the second lens 220 may be in contact with the object-side surface of the third lens 230.

Next, characteristics of the first lens 210 to the fourth lens 240 will be described.

The first lens 210 may have a positive refractive power, and may have a convex object-side surface and a convex image-side surface. The second lens 220 may have a positive refractive power, and may have a concave object-side surface and a convex image-side surface. The third lens 230 may have a negative refractive power, and may have a concave object-side surface and a convex image-side surface. The fourth lens 240 may have a negative refractive power, and may have a concave object-side surface and a concave image-side surface.

Next, the prism P, which is the optical path conversion member, will be described. For reference, the prism described below is a type of the optical path conversion member described in the claims, and may be changed to another member.

The prism P may include a plurality of reflective surfaces. For example, the prism P may include a first reflective surface and a second reflective surface. In an example, the first reflective surface and the second reflective surface may be substantially parallel to each other. The first reflective surface and the second reflective surface may have a considerable distance therebetween. For example, the distance from the first reflective surface to the second reflective surface may be greater than the height ImgHT of the imaging plane. In another example, the distance from the first reflective surface to the second reflective surface may be greater than four times the height ImgHT of the imaging plane.

The filter IF and the imaging plane IP may be disposed adjacent to the exit surface of the prism P.

The filter IF may block light of a specific wavelength. In an example, the filter IF, in accordance with one or more embodiments, may block infrared light. However, a type of light blocked by the filter IF is not limited to the infrared light. For example, the filter IF may block ultraviolet or visible light.

The imaging plane IP may be disposed at a point where light reflected from the prism P converges or forms an image, and may be formed by an image sensor IS or the like. In an example, the imaging plane IP may be formed on, or inside, the image sensor IS.

Figure 4:
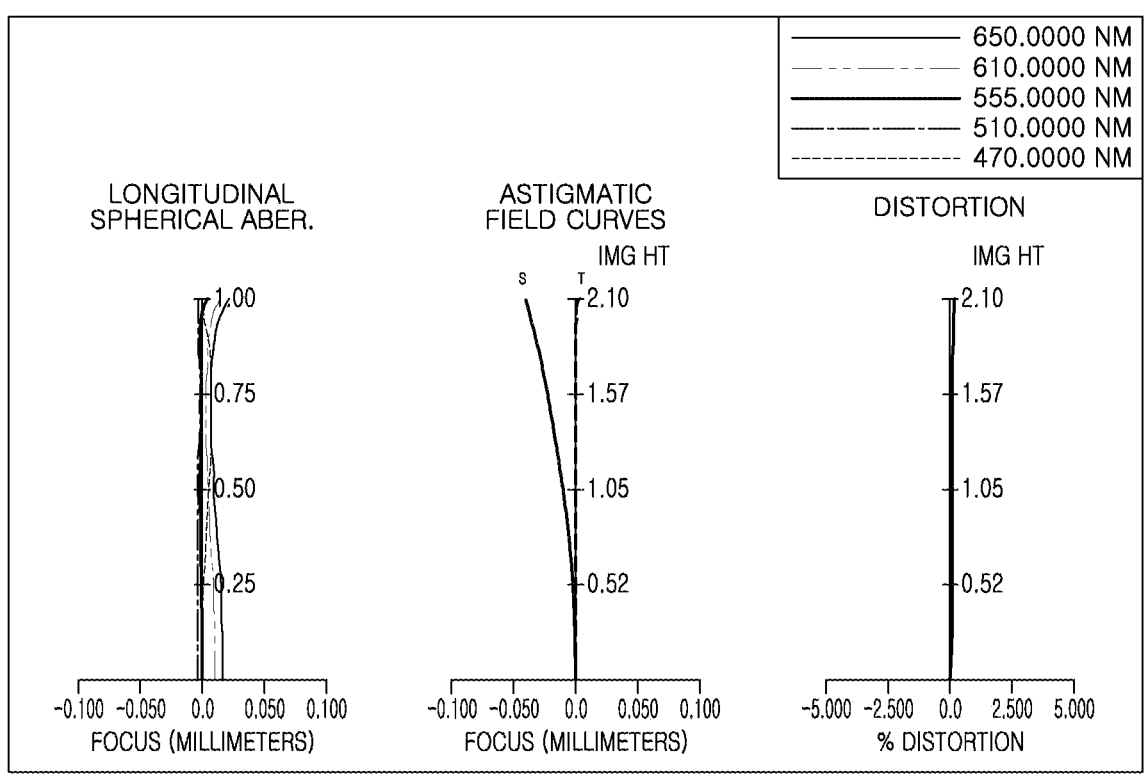
FIG. 4 illustrates an aberration curve of the example imaging lens system shown in FIG. 3.

The imaging lens system 200 configured as above may show aberration characteristics shown in FIG. 4. Tables 3 and 4 below each show the lens characteristics and aspherical value of the imaging lens system according to a second embodiment.

TABLE 3

| Surface no. | Component | Radius of curvature | Thickness/ Distance | Refractive index | Abbe number |
|---|---|---|---|---|---|
| S1 | First lens | 5.428 | 1.200 | 1.537 | 55.7 |
| S2 | | −23.359 | 0.300 | | |

TABLE 3-continued

| Surface no. | Component | Radius of curvature | Thickness/ Distance | Refractive index | Abbe number |
|---|---|---|---|---|---|
| S3 | Second lens | −13.891 | 0.800 | 1.570 | 37.4 |
| S4 | | −14.166 | 0.300 | | |
| S5 | Third lens | −15.3029 | 0.800 | 1.570 | 37.4 |
| S6 | | −41.1437 | 0.177 | | |
| S7 | Fourth lens | −32.728 | 0.545 | 1.619 | 25.9 |
| S8 | | 15.6308 | 1.000 | | |
| S9 | Prism | Infinity | 2.500 | 1.518 | 64.2 |
| S10 | | Infinity | 11.500 | 1.518 | 64.2 |
| S11 | | Infinity | 3.000 | 1.518 | 64.2 |
| S12 | | Infinity | 0.300 | | |
| S13 | Filter | Infinity | 0.210 | 1.518 | 64.2 |
| S14 | | Infinity | 0.300 | | |
| S15 | Imaging plane | Infinity | 0.001 | | |

TABLE 4

| Surface no. | S1 | S2 | S3 | S4 |
|---|---|---|---|---|
| K | −0.427289636 | −10.96366395 | −6.51352873 | −37.04127429 |
| A | 0.000135352 | 7.23892E−05 | 0.000529063 | −8.64E−06 |
| B | −3.6135E−05 | 8.20897E−05 | 0.00016957 | 0.000303313 |
| C | 0 | 0 | 0 | 0 |
| D | 0 | 0 | 0 | 0 |
| E | 0 | 0 | 0 | 0 |
| F | 0 | 0 | 0 | 0 |
| G | 0 | 0 | 0 | 0 |
| H | 0 | 0 | 0 | 0 |
| J | 0 | 0 | 0 | 0 |

| Surface no. | S5 | S6 | S7 | S8 |
|---|---|---|---|---|
| K | −10.76862408 | −98.79646204 | −94.95677185 | −12.94419926 |
| A | 0.003678668 | 0.001369146 | 0.001178011 | 0.004860345 |
| B | 0.000338754 | 0.000535777 | 0.000220387 | −1.42782E−05 |
| C | 0 | 0 | 0 | 0 |
| D | 0 | 0 | 0 | 0 |
| E | 0 | 0 | 0 | 0 |
| F | 0 | 0 | 0 | 0 |
| G | 0 | 0 | 0 | 0 |
| H | 0 | 0 | 0 | 0 |
| J | 0 | 0 | 0 | 0 |

Figure 5:
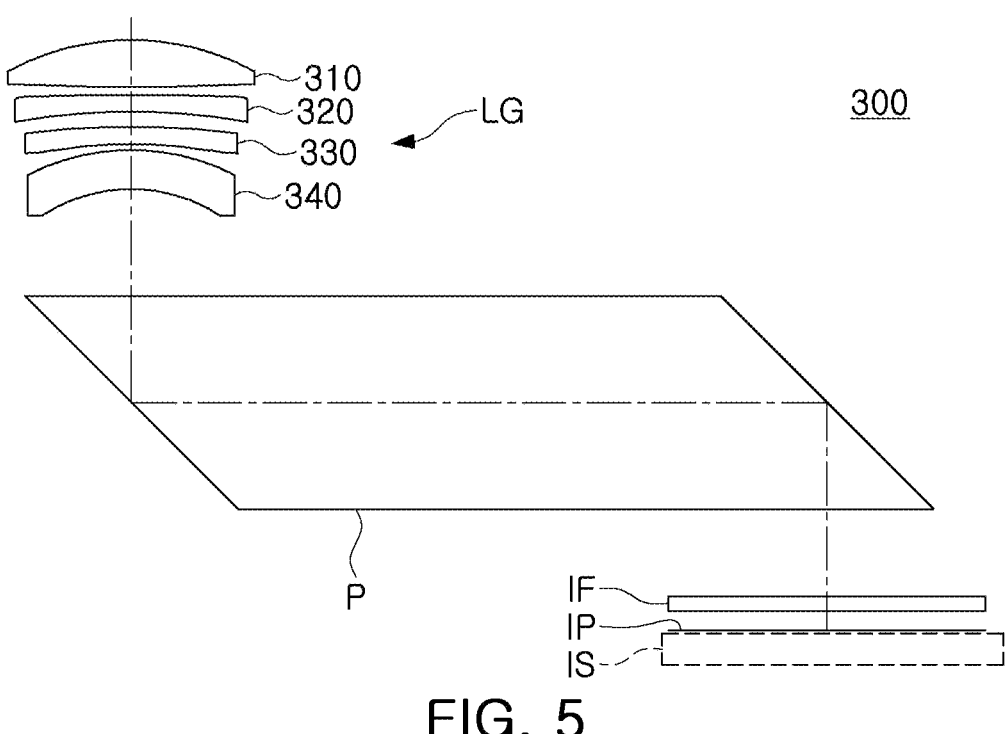
FIG. 5 illustrates a configuration diagram of an example imaging lens system, in accordance with one or more embodiments.

An example imaging lens system, according to a third embodiment, will be described with reference to FIG. 5.

An imaging lens system 300, in accordance with a third embodiment, may include a lens group LG and a prism P, which is a type of optical path conversion member. However, components of the imaging lens system 300 are not limited to the above-mentioned members. For example, the imaging lens system 300 may further include a filter IF and an imaging plane IP. The lens group LG and the prism P may be sequentially disposed from the object side to the imaging plane. In an example, the lens group LG may be disposed on an object side of the prism P, and the prism P may be disposed between the lens group LG and the imaging plane IP. Next, the above-mentioned components are described in order.

The lens group LG may include a plurality of lenses. For example, the lens group LG may include a first lens 310, a second lens 320, a third lens 330, and a fourth lens 340 sequentially disposed from the object side to the imaging side. The first lens 310 to the fourth lens 340 may be disposed at a predetermined interval. In a non-limited example, an image-side surface of the first lens 310 may not be in contact with an object-side surface of the second lens 320, and an image-side surface of the second lens 320 may not be in contact with an object-side surface of the third lens 330. However, this is only an example, and the first lens 310 to the fourth lens 340 may not be necessarily disposed spatially separate from each other. In an example, the image-side surface of the first lens 310 may be in contact with the object-side surface of the second lens 320, and the image-side surface of the second lens 320 may be in contact with the object-side surface of the third lens 330.

Next, the characteristics of the first lens 310 to the fourth lens 340 will be described.

The first lens 310 may have a positive refractive power, and may have a convex object-side surface and a convex image-side surface. The second lens 320 may have a negative refractive power, and may have a convex object-side surface and a concave image-side surface. The third lens 330 may have a negative refractive power, and may have a convex object-side surface and a concave image-side surface. The fourth lens 340 may have a negative refractive power, and may have a convex object-side surface and a concave image-side surface.

Next, the prism P which is the optical path conversion member will be described. For reference, the prism described below is a type of optical path conversion member described in the claims, and may be changed to another member.

The prism P may include a plurality of reflective surfaces. For example, the prism P may include a first reflective surface and a second reflective surface. In an example, the first reflective surface and the second reflective surface may be substantially parallel to each other. The first reflective surface and the second reflective surface may have a considerable distance therebetween. In an example, the distance from the first reflective surface to the second reflective surface may be greater than the height ImgHT of the imaging plane. In another example, the distance from the first reflective surface to the second reflective surface may be greater than four times the height ImgHT of the imaging plane.

The filter IF and the imaging plane IP may be disposed adjacent to the exit surface of the prism P.

The filter IF may block light of a specific wavelength. In an example, the filter IF, in accordance with one or more embodiments, may block infrared light. However, a type of light blocked by the filter IF is not limited to the infrared light. In an example, the filter IF may block ultraviolet or visible light.

The imaging plane IP may be disposed at a point where light reflected from the prism P converges or forms an image, and may be formed by an image sensor IS or the like. In an example, the imaging plane IP may be formed on, or inside, the image sensor IS.

Figure 6:
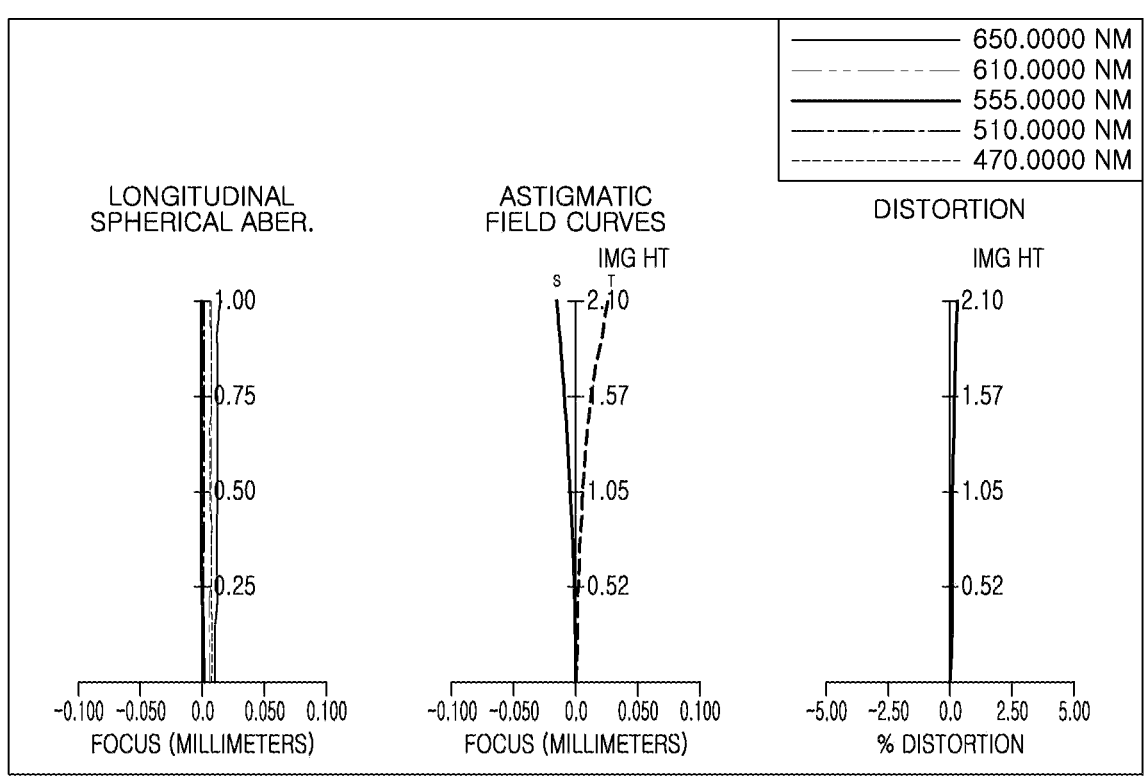
FIG. 6 illustrates an aberration curve of the example imaging lens system shown in FIG. 5.

The imaging lens system 300 configured as above may show aberration characteristics shown in FIG. 6. Tables 5 and 6 below each show the lens characteristics and aspherical value of the imaging lens system, in accordance with a third embodiment.

TABLE 5

| Surface no. | Component | Radius of curvature | Thickness/ Distance | Refractive index | Abbe number |
|---|---|---|---|---|---|
| S1 | First lens | 5.229 | 1.001 | 1.498 | 81.6 |
| S2 | | −46.247 | 0.148 | | |
| S3 | Second lens | 25.712 | 0.400 | 1.537 | 55.7 |
| S4 | | 15.826 | 0.300 | | |
| S5 | Third lens | 15.8359 | 0.400 | 1.537 | 55.7 |
| S6 | | 11.0379 | 0.145 | | |
| S7 | Fourth lens | 4.50157 | 0.800 | 1.644 | 23.5 |
| S8 | | 3.202 | 1.000 | | |
| S9 | Prism | Infinity | 2.500 | 1.518 | 64.2 |
| S10 | | Infinity | 11.500 | 1.518 | 64.2 |
| S11 | | Infinity | 3.000 | 1.518 | 64.2 |
| S12 | | Infinity | 0.300 | | |
| S13 | Filter | Infinity | 0.210 | 1.518 | 64.2 |
| S14 | | Infinity | 0.297 | | |
| S15 | Imaging plane | Infinity | 0.004 | | |

TABLE 6

| Surface no. | S1 | S2 | S3 | S4 |
|---|---|---|---|---|
| K | 0 | 0 | 23.54978475 | 24.73861693 |
| A | 0 | 0 | −0.000795947 | −0.000135536 |
| B | 0 | 0 | 2.60425E−05 | −3.97628E−05 |
| C | 0 | 0 | 0 | 0 |
| D | 0 | 0 | 0 | 0 |
| E | 0 | 0 | 0 | 0 |
| F | 0 | 0 | 0 | 0 |
| G | 0 | 0 | 0 | 0 |
| H | 0 | 0 | 0 | 0 |
| J | 0 | 0 | 0 | 0 |

| Surface no. | S5 | S6 | S7 | S8 |
|---|---|---|---|---|
| K | −33.69839484 | −6.633497026 | 1.386368601 | 0.374421533 |
| A | 0.0011868 | 0.000122465 | −0.001414292 | −0.00105035 |

TABLE 6-continued

| B | 0.000117472 | 0.000203323 | −0.000450214 | −0.000680993 |
|---|---|---|---|---|
| C | 0 | 0 | 0 | 0 |
| D | 0 | 0 | 0 | 0 |
| E | 0 | 0 | 0 | 0 |
| F | 0 | 0 | 0 | 0 |
| G | 0 | 0 | 0 | 0 |
| H | 0 | 0 | 0 | 0 |
| J | 0 | 0 | 0 | 0 |

Figure 7:
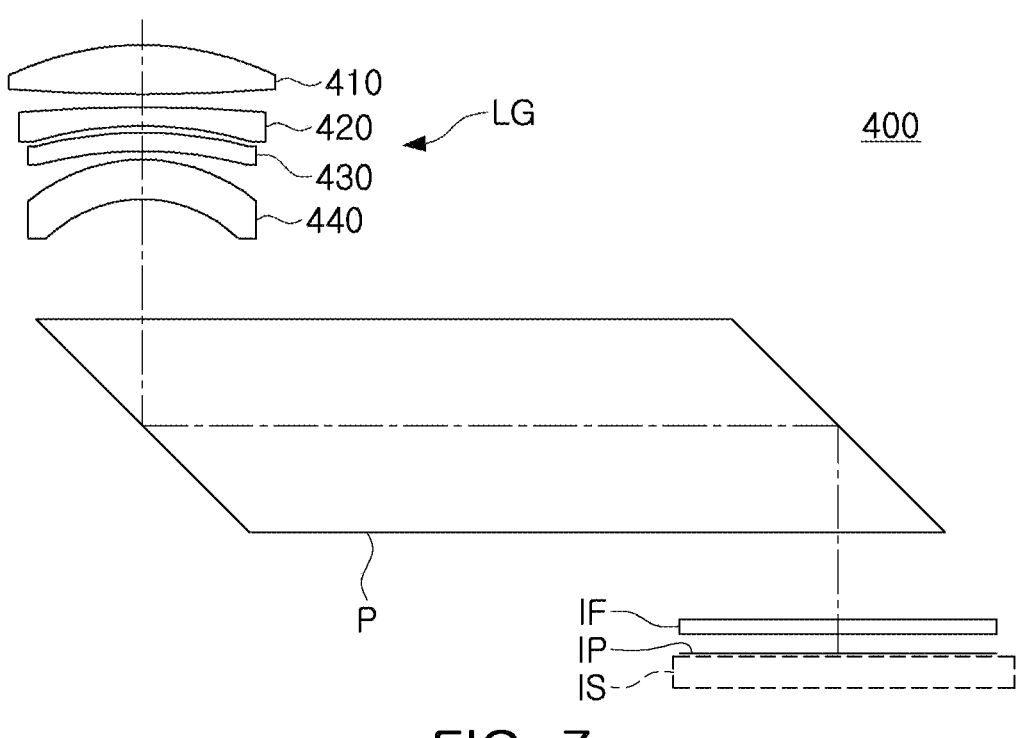
FIG. 7 illustrates a configuration diagram of an example imaging lens system, in accordance with one or more embodiments.

An example imaging lens system, in accordance with a fourth embodiment, will be described with reference to FIG. 7.

An example imaging lens system 400, in accordance with a fourth embodiment, may include a lens group LG and a prism P, which is a type of the optical path conversion member. However, components of the imaging lens system 400 are not limited to the above-mentioned members. In an example, the imaging lens system 400 may further include a filter IF and an imaging plane IP. The lens group LG and the prism P may be sequentially disposed from the object side to the imaging plane. For example, the lens group LG may be disposed on an object side of the prism P, and the prism P may be disposed between the lens group LG and the imaging plane IP.

Next, the above-mentioned components are described in order.

The lens group LG may include a plurality of lenses. In an example, the lens group LG may include a first lens 410, a second lens 420, a third lens 430, and a fourth lens 440 sequentially disposed from the object side to the imaging plane. The first lens 410 to the fourth lens 440 may be disposed at a predetermined interval. In a non-limited example, an image-side surface of the first lens 410 may not be in contact with an object-side surface of the second lens 420, and an image-side surface of the second lens 420 may not be in contact with an object-side surface of the third lens 430. However, the first lens 410 to the fourth lens 440 may not be necessarily disposed spatially separate from each other. For example, the image-side surface of the first lens 410 may be in contact with the object-side surface of the second lens 420, and the image-side surface of the second lens 420 may be in contact with the object-side surface of the third lens 430.

Next, characteristics of the first lens 410 to the fourth lens 440 will be described.

The first lens 410 may have a positive refractive power, and may have a convex object-side surface and a convex image-side surface. The second lens 420 may have a negative refractive power, and may have a convex object-side surface and a concave image-side surface. The third lens 430 may have a positive refractive power, and have a convex object-side surface and a concave image-side surface. The fourth lens 440 may have a negative refractive power, and have a convex object-side surface and a concave image-side surface.

Next, the prism P which is the optical path conversion member will be described. For reference, the prism described below is a type of the optical path conversion member described in the claims, and may be changed to another member.

The prism P may include a plurality of reflective surfaces. In an example, the prism P may include a first reflective surface and a second reflective surface. The first reflective surface and the second reflective surface may be substantially parallel to each other. The first reflective surface and the second reflective surface may have a considerable distance therebetween. In an example, the distance from the first reflective surface to the second reflective surface may be greater than the height ImgHT of the imaging plane. In an example, the distance from the first reflective surface to the second reflective surface may be greater than four times the height ImgHT of the imaging plane.

The filter IF and the imaging plane IP may be disposed adjacent to the exit surface of the prism P.

The filter IF may block light of a specific wavelength. For example, the filter IF may block infrared light. However, a type of light blocked by the filter IF is not limited to the infrared light. In an example, the filter IF may block ultraviolet or visible light.

The imaging plane IP may be disposed at a point where light reflected from the prism P converges or forms an image, and may be formed by an image sensor IS or the like. For example, the imaging plane IP may be formed on or inside the image sensor IS.

Figure 8:
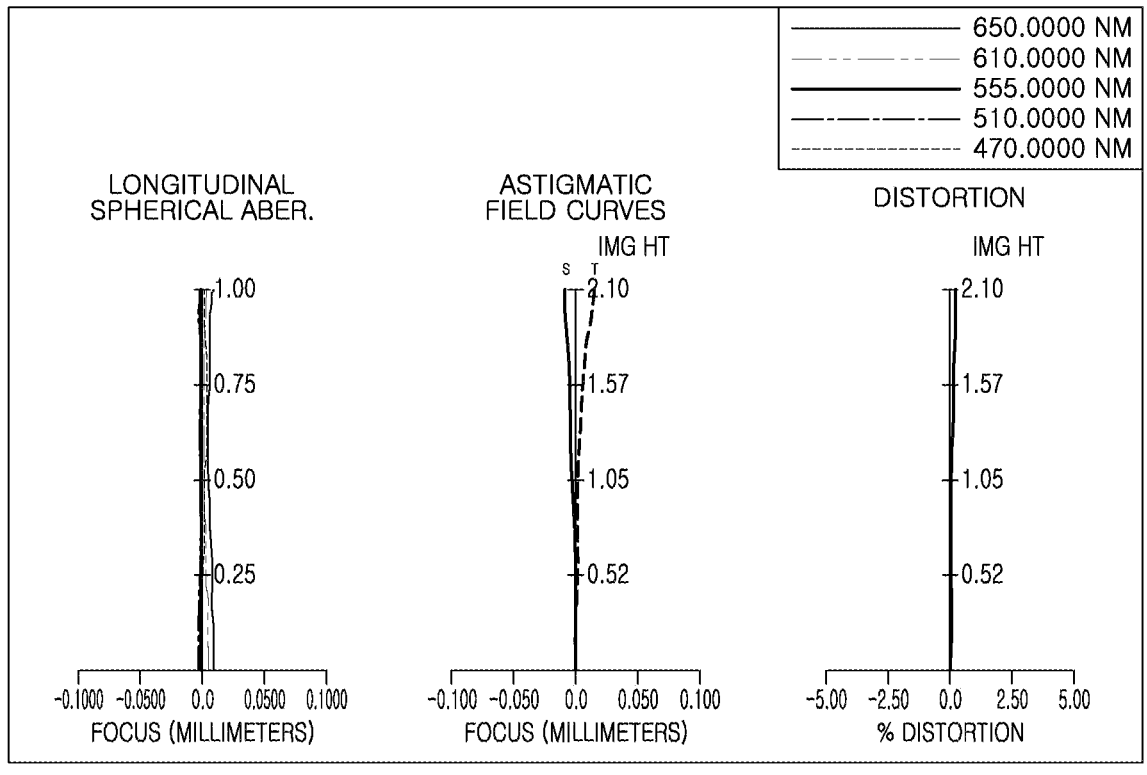
FIG. 8 illustrates an aberration curve of the example imaging lens system shown in FIG. 7.

The example imaging lens system 400 configured as above may show aberration characteristics shown in FIG. 8. Tables 7 and 8 below each illustrate the lens characteristics and aspherical value of the example imaging lens system in accordance with a fourth embodiment.

TABLE 7

| Surface no. | Component | Radius of curvature | Thickness/ Distance | Refractive index | Abbe number |
|---|---|---|---|---|---|
| S1 | First lens | 5.628 | 0.969 | 1.498 | 81.6 |
| S2 | | −34.625 | 0.254 | | |
| S3 | Second lens | 24.406 | 0.400 | 1.629 | 35.7 |
| S4 | | 8.258 | 0.100 | | |
| S5 | Third lens | 9.67632 | 0.400 | 1.537 | 55.7 |
| S6 | | 14.0332 | 0.100 | | |
| S7 | Fourth lens | 2.98431 | 0.800 | 1.667 | 20.4 |
| S8 | | 2.30738 | 1.000 | | |
| S9 | Prism | Infinity | 2.500 | 1.518 | 64.2 |
| S10 | | Infinity | 11.500 | 1.518 | 64.2 |
| S11 | | Infinity | 3.000 | 1.518 | 64.2 |
| S12 | | Infinity | 0.500 | | |
| S13 | Filter | Infinity | 0.210 | 1.518 | 64.2 |
| S14 | | Infinity | 0.099 | | |
| S15 | Imaging plane | Infinity | 0.001 | | |

TABLE 8

| Surface no. | S1 | S2 | S3 | S4 |
|---|---|---|---|---|
| K | 0 | 0 | 0 | 0 |
| A | 0 | 0 | 0 | 0 |

TABLE 8-continued

| B | 0 | 0 | 0 | 0 |
| C | 0 | 0 | 0 | 0 |
| D | 0 | 0 | 0 | 0 |
| E | 0 | 0 | 0 | 0 |
| F | 0 | 0 | 0 | 0 |
| G | 0 | 0 | 0 | 0 |
| H | 0 | 0 | 0 | 0 |
| J | 0 | 0 | 0 | 0 |

| Surface no. | S5 | S6 | S7 | S8 |
| --- | --- | --- | --- | --- |
| K | 4.89320034 | 18.18801156 | −1.511431563 | −1.24492589 |
| A | 0.002643782 | 0.004347627 | 0.003472447 | 0.004113889 |
| B | −0.000224367 | −0.0002907 | 0.0001343 | 0.000479743 |
| C | 0 | 0 | 0 | 0 |
| D | 0 | 0 | 0 | 0 |
| E | 0 | 0 | 0 | 0 |
| F | 0 | 0 | 0 | 0 |
| G | 0 | 0 | 0 | 0 |
| H | 0 | 0 | 0 | 0 |
| J | 0 | 0 | 0 | 0 |

An example imaging lens system, in accordance with a fifth embodiment will be described with reference to FIG. 9.

An example imaging lens system 500, in accordance with the fifth embodiment may include a lens group LG and a prism P, which is a type of the optical path conversion member. However, components of the imaging lens system 500 are not limited to the above-mentioned members. In an example, the imaging lens system 500 may further include a filter IF and an imaging plane IP. The lens group LG and the prism P may be sequentially disposed from the object side to the imaging plane. In an example, the lens group LG may be disposed on an object side of the prism P, and the prism P may be disposed between the lens group LG and the imaging plane IP.

Next, the above-mentioned components are described in order.

The lens group LG may include a plurality of lenses. For example, the lens group LG may include a first lens 510, a second lens 520, a third lens 530, and a fourth lens 540 sequentially disposed from the object side to the imaging plane. The first lens 510 to the fourth lens 540 may be disposed at a predetermined interval. In an example, an image-side surface of the first lens 510 may not be in contact with an object-side surface of the second lens 520, and an image-side surface of the second lens 520 may not be in contact with an object-side surface of the third lens 530. However, the first lens 510 to the fourth lens 540 may not be necessarily disposed spatially separate from each other. In an example, the image-side surface of the first lens 510 may be in contact with the object-side surface of the second lens 520, and the image-side surface of the second lens 520 may be in contact with the object-side surface of the third lens 530.

Next, the characteristics of the first lens 510 to the fourth lens 540 will be described.

The first lens 510 may have a positive refractive power, and may have a convex object-side surface and a convex image-side surface. The second lens 520 may have a negative refractive power, and may have a concave object-side surface and a concave image-side surface. The third lens 530 may have a negative refractive power, and may have a convex object-side surface and a concave image-side surface. The fourth lens 540 may have a positive refractive power, and may have a convex object-side surface and a concave image-side surface.

Next, the prism P which is the optical path conversion member will be described. For reference, the prism described below is a type of the optical path conversion member described in the claims, and may be changed to another member.

The prism P may include a plurality of reflective surfaces. For example, the prism P may include a first reflective surface and a second reflective surface. The first reflective surface and the second reflective surface may be substantially parallel to each other. The first reflective surface and the second reflective surface may have a considerable distance therebetween. In an example, the distance from the first reflective surface to the second reflective surface may be greater than the height ImgHT of the imaging plane. In another example, the distance from the first reflective surface to the second reflective surface may be greater than four times the height ImgHT of the imaging plane.

The filter IF and the imaging plane IP may be disposed adjacent to the exit surface of the prism P.

The filter IF may block light of a specific wavelength. In an example, the filter IF according to this e embodiment may block infrared light. However, a type of light blocked by the filter IF is not limited to the infrared light. In an example, the filter IF may block ultraviolet or visible light.

The imaging plane IP may be disposed at a point where light reflected from the prism P converges or forms an image, and may be formed by an image sensor IS or the like. In an example, the imaging plane IP may be formed on or inside the image sensor IS.

Figures 9, 10:
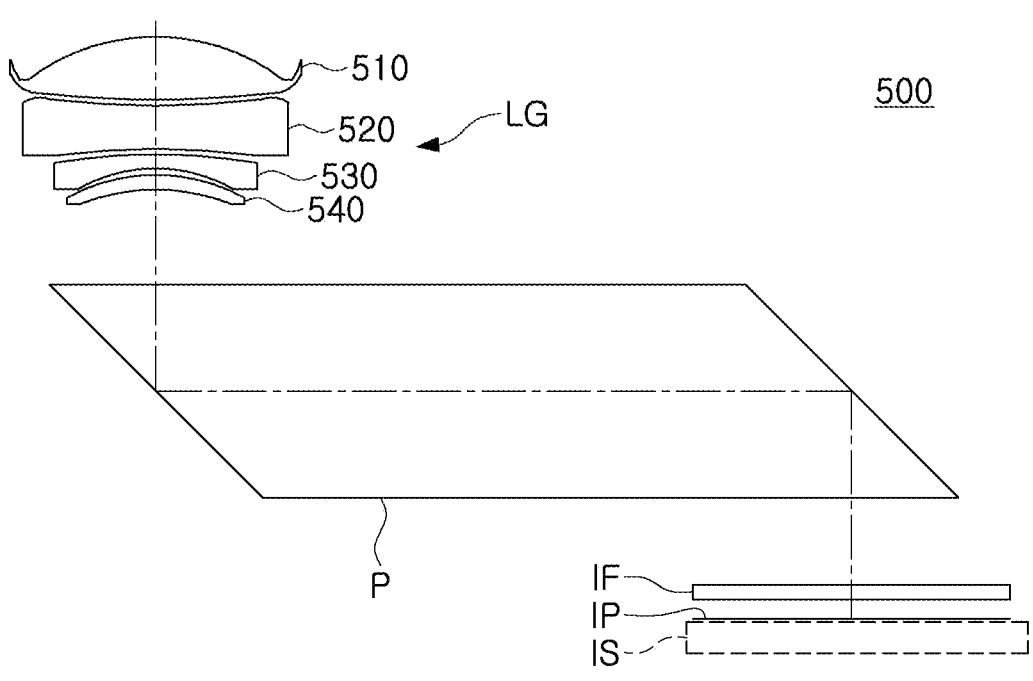
FIG. 9 illustrates a configuration diagram of an example imaging lens system, in accordance with one or more embodiments.
FIG. 10 illustrates an aberration curve of the example imaging lens system shown in FIG. 9.

The imaging lens system 500 configured as above may show aberration characteristics shown in FIG. 10. Tables 9 and 10 below each show the lens characteristics and aspherical value of the imaging lens system according to this embodiment.

TABLE 9

| Surface no. | Component | Radius of curvature | Thickness/ Distance | Refractive index | Abbe number |
| --- | --- | --- | --- | --- | --- |
| S1 | First lens | 3.920 | 1.248 | 1.537 | 55.7 |
| S2 | | −20.796 | 0.100 | | |
| S3 | Second lens | −16.640 | 0.866 | 1.537 | 55.7 |
| S4 | | 42.684 | 0.100 | | |
| S5 | Third lens | 8.24427 | 0.276 | 1.619 | 26.0 |
| S6 | | 3.09409 | 0.090 | | |

TABLE 9-continued

| Surface no. | Component | Radius of curvature | Thickness/ Distance | Refractive index | Abbe number |
|---|---|---|---|---|---|
| S7 | Fourth lens | 3.13333 | 0.300 | 1.619 | 26.0 |
| S8 | | 3.65333 | 1.000 | | |
| S9 | Prism | Infinity | 2.500 | 1.518 | 64.2 |
| S10 | | Infinity | 11.500 | 1.518 | 64.2 |
| S11 | | Infinity | 3.000 | 1.518 | 64.2 |
| S12 | | Infinity | 0.300 | | |
| S13 | Filter | Infinity | 0.210 | 1.518 | 64.2 |
| S14 | | Infinity | 0.174 | | |
| S15 | Imaging plane | Infinity | 0.012 | | |

TABLE 10

| Surface no. | S1 | S2 | S3 | S4 |
|---|---|---|---|---|
| K | 0.307798536 | 0 | 0 | −99 |
| A | 0.000136057 | 8.13301E−06 | 6.96377E−06 | −0.005359156 |
| B | 0.000201712 | −6.86847E−06 | 1.13979E−05 | 0.015495424 |
| C | −8.90915E−05 | −3.28204E−06 | 4.2792E−06 | −0.014746583 |
| D | 3.50104E−05 | −6.23262E−07 | 7.5917E−07 | 0.007995411 |
| E | −7.23101E−06 | −6.95057E−08 | 6.09557E−08 | −0.002590804 |
| F | 5.03024E−07 | −6.43063E−09 | −1.4069E−09 | 0.000521409 |
| G | −1.36187E−08 | −1.83791E−09 | 1.48156E−09 | −6.32677E−05 |
| H | 2.26885E−08 | −7.39639E−10 | 1.63303E−09 | 3.0467E−06 |
| J | −4.0368E−09 | −2.05532E−10 | 6.59902E−10 | 1.60776E−07 |

| Surface no. | S5 | S6 | S7 | S8 |
|---|---|---|---|---|
| K | −1.21E+01 | 0 | 0 | 5.167E−01 |
| A | −9.669E−03 | 6.32737E−05 | −9.03389E−05 | −5.987E−03 |
| B | 1.268E−02 | 2.29929E−05 | −3.3091E−05 | −4.815E−03 |
| C | −8.089E−03 | 8.67335E−06 | −1.21114E−05 | 1.797E−02 |
| D | −6.867E−04 | 2.88785E−06 | −3.81995E−06 | −2.870E−02 |
| E | 0.00358023 | 7.30698E−07 | −8.50557E−07 | 0.024879535 |
| F | −0.001963608 | 3.37313E−08 | 4.89822E−08 | −0.012483033 |
| G | 0.000493423 | −9.11408E−08 | 2.33543E−07 | 0.003600003 |
| H | −6.03086E−05 | −9.46293E−08 | 2.78667E−08 | −0.000550083 |
| J | 2.89784E−06 | −6.84182E−08 | 3.96948E−08 | 3.43173E−05 |

Figure 11:
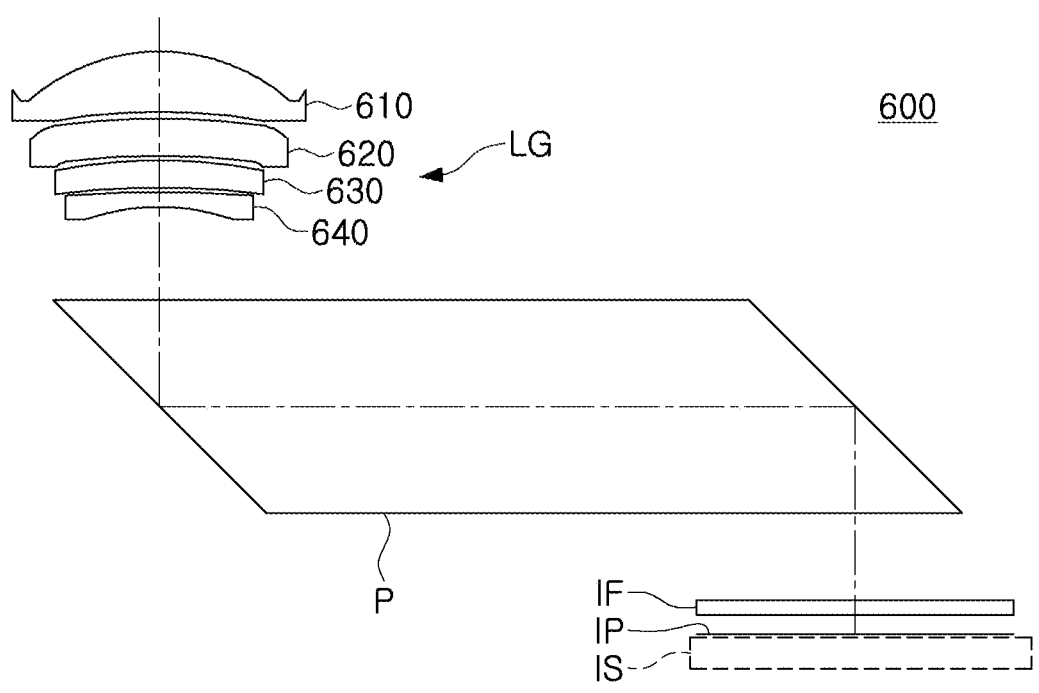
FIG. 11 illustrates a configuration diagram of an example imaging lens system, in accordance with one or more embodiments.

An example imaging lens system according to a sixth embodiment will be described with reference to FIG. 11.

An example imaging lens system 600 according to a sixth embodiment may include a lens group LG and a prism P, which is a type of the optical path conversion member. However, components of the imaging lens system 600 are not limited to the above-mentioned members. In an example, the imaging lens system 600 may further include a filter IF and an imaging plane IP. The lens group LG and the prism P may be sequentially disposed from the object side to the imaging plane. In an example, the lens group LG may be disposed on an object side of the prism P, and the prism P may be disposed between the lens group LG and the imaging plane IP.

Next, the above-mentioned components are described in order.

The lens group LG may include a plurality of lenses. For example, the lens group LG may include a first lens 610, a second lens 620, a third lens 630, and a fourth lens 640 sequentially disposed from the object side to the imaging plane. The first lens 610 to the fourth lens 640 may be disposed at a predetermined interval. In an example, an image-side surface of the first lens 610 may not be in contact with an object-side surface of the second lens 620, and an image-side surface of the second lens 620 may not be in contact with an object-side surface of the third lens 630. However, the first lens 610 to the fourth lens 640 may not be necessarily disposed spatially separate from each other. In an example, the image-side surface of the first lens 610 may be in contact with the object-side surface of the second lens 620, and the image-side surface of the second lens 620 may be in contact with the object-side surface of the third lens 630.

Next, the characteristics of the first lens 610 to the fourth lens 640 will be described.

The first lens 610 may have a positive refractive power, and may have a convex object-side surface and a concave image-side surface. The second lens 620 may have a positive refractive power, and may have a convex object-side surface and a concave image-side surface. The third lens 630 may have a positive refractive power, and may have a convex object-side surface and a concave image-side surface. The fourth lens 640 may have a negative refractive power, and may have a convex object-side surface and a concave image-side surface.

Next, the prism P which is the optical path conversion member will be described. For reference, the prism described below is a type of the optical path conversion member described in the claims, and may be changed to another member.

The prism P may include a plurality of reflective surfaces. For example, the prism P may include a first reflective surface and a second reflective surface. The first reflective surface and the second reflective surface may be substantially parallel to each other. The first reflective surface and the second reflective surface may have a considerable distance therebetween. In an example, the distance from the first reflective surface to the second reflective surface may be greater than the height ImgHT of the imaging plane. In another example, the distance from the first reflective surface to the second reflective surface may be greater than four times the height ImgHT of the imaging plane.

The filter IF and the imaging plane IP may be disposed adjacent to the exit surface of the prism P.

The filter IF may block light of a specific wavelength. In an example, the filter IF according to this embodiment may block infrared light. However, a type of light blocked by the filter IF is not limited to the infrared light. In an example, the filter IF may block ultraviolet or visible light.

The imaging plane IP may be disposed at a point where light reflected from the prism P converges or forms an image, and may be formed by an image sensor IS or the like. In an example, the imaging plane IP may be formed on or inside the image sensor IS.

Figure 12:
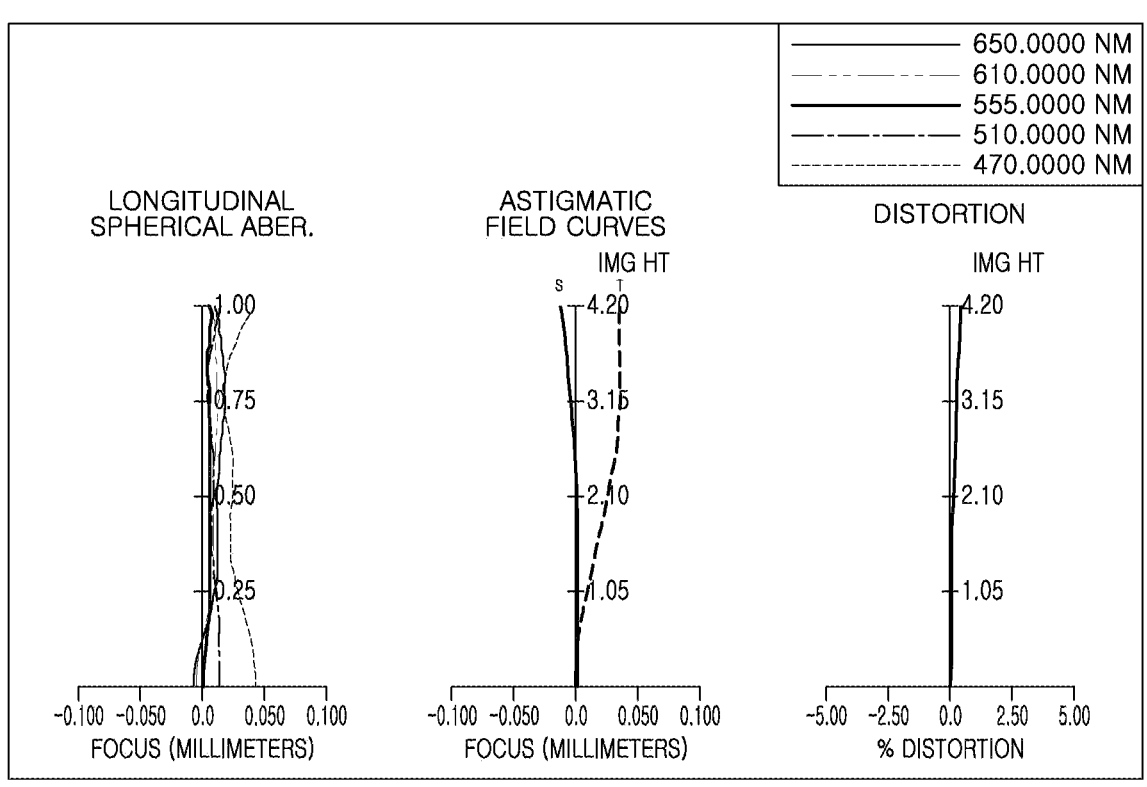
FIG. 12 illustrates an aberration curve of the example imaging lens system shown in FIG. 11.

The imaging lens system 600 configured as above may show aberration characteristics shown in FIG. 12. Tables 11 and 12 below each show the lens characteristics and aspherical value of the imaging lens system according to this embodiment.

TABLE 11

| Surface no. | Component | Radius of curvature | Thickness/ Distance | Refractive index | Abbe number |
|---|---|---|---|---|---|
| S1 | First lens | 5.818 | 1.795 | 1.537 | 55.7 |
| S2 | | 25.349 | 0.100 | | |
| S3 | Second lens | 20.693 | 1.159 | 1.667 | 20.3 |
| S4 | | 26.185 | 0.100 | | |
| S5 | Third lens | 9.53363 | 0.811 | 1.537 | 55.7 |
| S6 | | 15.1724 | 0.103 | | |
| S7 | Fourth lens | 28.8904 | 0.405 | 1.619 | 26.0 |
| S8 | | 5.47386 | 1.500 | | |
| S9 | Prism | Infinity | 3.750 | 1.518 | 64.2 |
| S10 | | Infinity | 17.250 | 1.518 | 64.2 |
| S11 | | Infinity | 4.500 | 1.518 | 64.2 |
| S12 | | Infinity | 0.300 | | |
| S13 | Filter | Infinity | 0.210 | 1.518 | 64.2 |
| S14 | | Infinity | 0.295 | | |
| S15 | Imaging plane | Infinity | 0.005 | | |

TABLE 12

| Surface no. | S1 | S2 | S3 | S4 |
|---|---|---|---|---|
| K | 0.344928349 | 0 | 0 | −99 |
| A | 9.70164E−05 | −1.76601E−05 | 2.55457E−05 | −0.001531536 |
| B | 2.73181E−05 | −2.14958E−06 | 6.19014E−06 | 0.002042309 |
| C | −4.91204E−06 | −2.90562E−07 | 8.79374E−07 | −0.000863204 |
| D | 9.3407E−07 | −8.86232E−09 | 6.91697E−08 | 0.000207981 |
| E | −8.39693E−08 | 1.21392E−09 | 3.18914E−09 | −2.99433E−05 |
| F | 2.35343E−09 | 1.51258E−10 | 1.24428E−10 | 2.68181E−06 |
| G | −5.10444E−11 | −5.95195E−13 | 2.71575E−11 | −1.43975E−07 |
| H | 2.31185E−11 | −1.48893E−12 | 6.20088E−12 | 3.15609E−09 |
| J | −1.5758E−12 | −1.59842E−13 | 8.88953E−13 | 7.55353E−11 |

| Surface no. | S5 | S6 | S7 | S8 |
|---|---|---|---|---|
| K | −1.17E+01 | 0 | 0 | 5.900E−01 |
| A | −2.948E−03 | 6.24731E−05 | −0.000103984 | −1.125E−03 |
| B | 2.041E−03 | 1.08429E−05 | −1.15055E−05 | −1.025E−03 |
| C | −6.022E−04 | 1.98602E−06 | −1.68379E−06 | 1.389E−03 |
| D | −1.099E−05 | 2.64153E−07 | −2.29467E−07 | −9.991E−04 |
| E | 4.42323E−05 | 1.79879E−08 | −2.61396E−08 | 0.00039859 |
| F | −1.05033E−05 | −3.00074E−09 | −1.60817E−09 | −9.29334E−05 |
| G | 1.13117E−06 | −1.53564E−09 | 1.86611E−10 | 1.25407E−05 |
| H | −5.9262E−08 | −4.38528E−10 | −8.04452E−11 | −9.0042E−07 |
| J | 1.22222E−09 | −1.07522E−10 | −1.71932E−11 | 2.64504E−08 |

Figure 13:
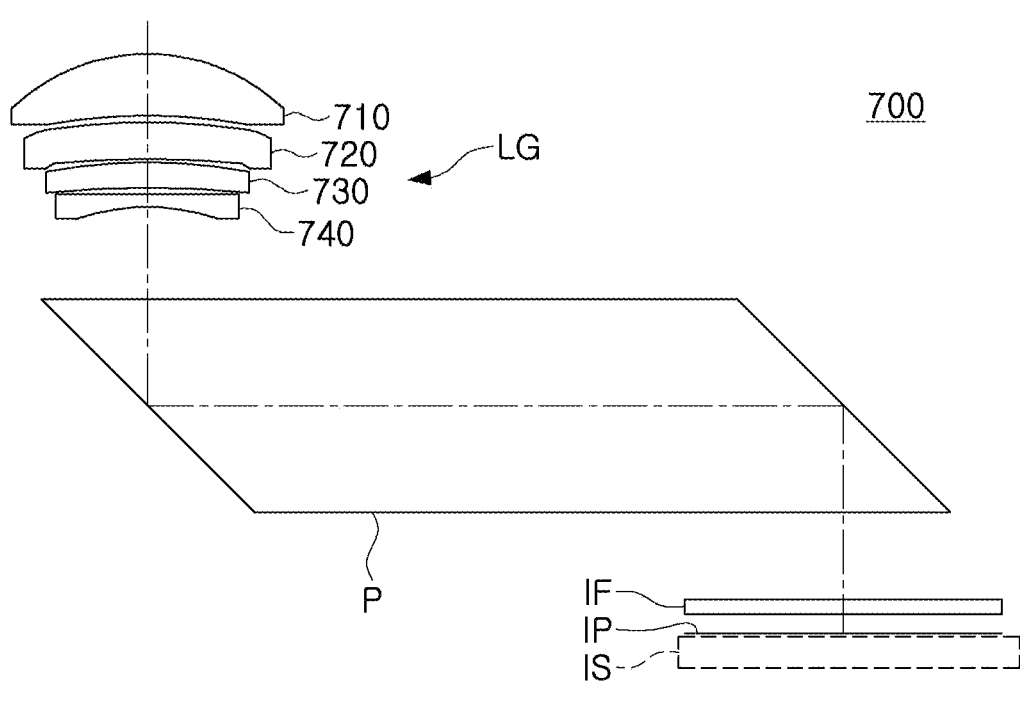
FIG. 13 illustrates a configuration diagram of an example imaging lens system, in accordance with one or more embodiments.

The An example imaging lens system in accordance with a seventh embodiment will be described with reference to FIG. 13.

An example imaging lens system 700 according to this embodiment may include a lens group LG and a prism P, which is a type of the optical path conversion member. However, components of the imaging lens system 700 are not limited to the above-mentioned members. In an example, the imaging lens system 700 may further include a filter IF and an imaging plane IP. The lens group LG and the prism P may be sequentially disposed from the object side to the imaging plane. In an example, the lens group LG may be disposed on an object side of the prism P, and the prism P may be disposed between the lens group LG and the imaging plane IP.

Next, the above-mentioned components are described in order.

The lens group LG may include a plurality of lenses. For example, the lens group LG may include a first lens 710, a second lens 720, a third lens 730, and a fourth lens 740 sequentially disposed from the object side to the imaging plane. The first lens 710 to the fourth lens 740 may be disposed at a predetermined interval. For example, an image-side surface of the first lens 710 may not be in contact with an object-side surface of the second lens 720, and an image-side surface of the second lens 720 may not be in contact with an object-side surface of the third lens 730. However, the first lens 710 to the fourth lens 740 may not be necessarily disposed spatially separate from each other. In an example, the image-side surface of the first lens 710 may be in contact with the object-side surface of the second lens 720, and the image-side surface of the second lens 720 may be in contact with the object-side surface of the third lens 730.

Next, the characteristics of the first lens 710 to the fourth lens 740 will be described.

The first lens 710 may have a positive refractive power, and may have a convex object-side surface and a concave image-side surface. The second lens 720 may have a positive refractive power, and may have a convex object-side surface and a concave image-side surface. The third lens 730 may have a positive refractive power, and may have a convex object-side surface and a concave image-side surface. The fourth lens 740 may have a negative refractive power, and may have a convex object-side surface and a concave image-side surface.

Next, the prism P which is the optical path conversion member will be described. For reference, the prism described below is a type of the optical path conversion member described in the claims, and may be changed to another member.

The prism P may include a plurality of reflective surfaces. In an example, the prism P may include a first reflective surface and a second reflective surface. The first reflective surface and the second reflective surface may be substantially parallel to each other. The first reflective surface and the second reflective surface may have a considerable distance therebetween. For example, the distance from the first reflective surface to the second reflective surface may be greater than the height ImgHT of the imaging plane. In another example, the distance from the first reflective surface to the second reflective surface may be greater than four times the height ImgHT of the imaging plane.

The filter IF and the imaging plane IP may be disposed adjacent to the exit surface of the prism P.

The filter IF may block light of a specific wavelength. In an example, the filter IF according to this embodiment may block infrared light. However, a type of light blocked by the filter IF is not limited to the infrared light. In an example, the filter IF may block ultraviolet or visible light.

The imaging plane IP may be disposed at a point where light reflected from the prism P converges or forms an image, and may be formed by an image sensor IS or the like. In an example, the imaging plane IP may be formed on or inside the image sensor IS.

Figure 14:
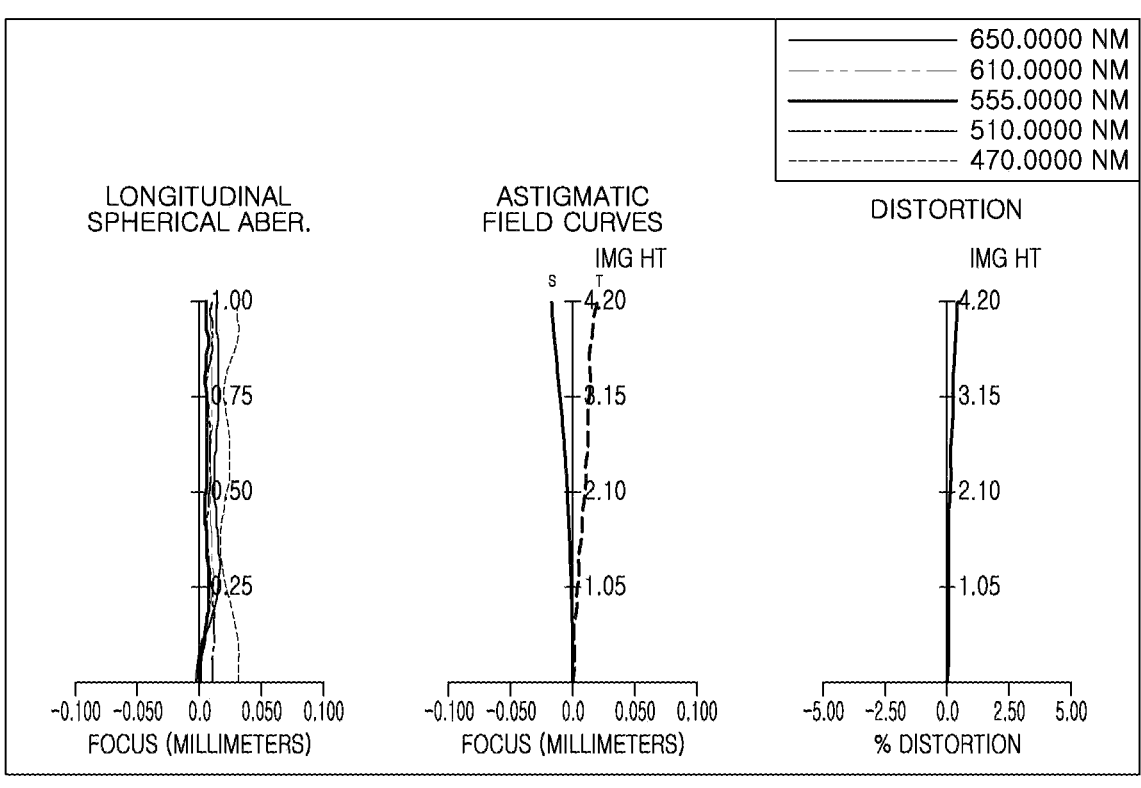
FIG. 14 illustrates an aberration curve of the example imaging lens system shown in FIG. 13.

The imaging lens system 700 configured as above may show aberration characteristics shown in FIG. 14. Tables 13 and 14 below each show the lens characteristics and aspherical value of the imaging lens system according to this embodiment.

TABLE 13

| Surface no. | Component | Radius of curvature | Thickness/ Distance | Refractive index | Abbe number |
|---|---|---|---|---|---|
| S1 | First lens | 5.735 | 1.809 | 1.537 | 55.7 |
| S2 | | 25.245 | 0.100 | | |
| S3 | Second lens | 17.877 | 1.094 | 1.667 | 20.3 |
| S4 | | 28.068 | 0.100 | | |
| S5 | Third lens | 9.63366 | 0.756 | 1.537 | 55.7 |
| S6 | | 17.9257 | 0.128 | | |
| S7 | Fourth lens | 68.0174 | 0.350 | 1.619 | 26.0 |
| S8 | | 5.34746 | 1.200 | | |
| S9 | Prism | Infinity | 3.750 | 1.518 | 64.2 |
| S10 | | Infinity | 17.250 | 1.518 | 64.2 |
| S11 | | Infinity | 4.500 | 1.518 | 64.2 |
| S12 | | Infinity | 0.500 | | |
| S13 | Filter | Infinity | 0.210 | 1.518 | 64.2 |
| S14 | | Infinity | 0.394 | | |
| S15 | Imaging plane | Infinity | 0.006 | | |

Figure 15:
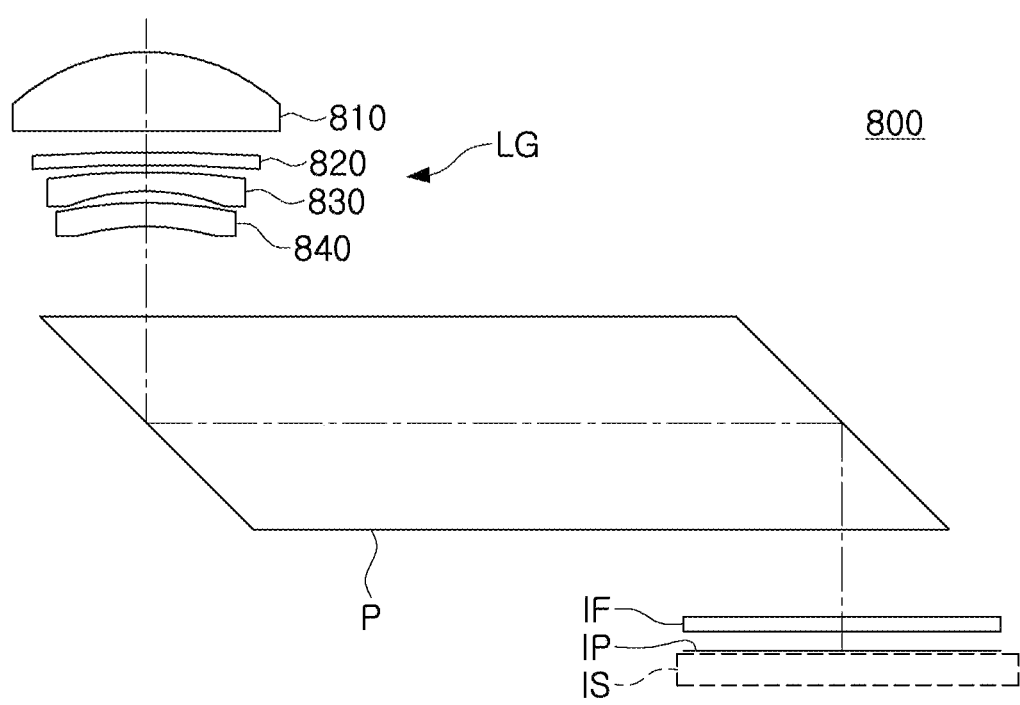
FIG. 15 illustrates a configuration diagram of an example imaging lens system, in accordance with one or more embodiments.

An example imaging lens system in accordance with an eighth embodiment will be described with reference to FIG. 15.

An imaging lens system 800 according to this eight embodiment may include a lens group LG and a prism P, which is a type of the optical path conversion member. However, components of the imaging lens system 800 are not limited to the above-mentioned members. For example, the imaging lens system 800 may further include a filter IF and an imaging plane IP. The lens group LG and the prism P may be sequentially disposed from the object side to the imaging plane. In an example, the lens group LG may be disposed on an object side of the prism P, and the prism P may be disposed between the lens group LG and the imaging plane IP.

Next, the above-mentioned components are described in order.

The lens group LG may include a plurality of lenses. For example, the lens group LG may include a first lens 810, a second lens 820, a third lens 830, and a fourth lens 840 sequentially disposed from the object side to the imaging plane. The first lens 810 to the fourth lens 840 may be disposed at a predetermined interval. In an example, an image-side surface of the first lens 810 may not be in contact with an object-side surface of the second lens 820, and an image-side surface of the second lens 820 may not be in contact with an object-side surface of the third lens 830. However, the first lens 810 to the fourth lens 840 may not be necessarily disposed spatially separate from each other. In an example, the image-side surface of the first lens 810 may be in contact with the object-side surface of the second lens 820, and the image-side surface of the second lens 820 may be in contact with the object-side surface of the third lens 830.

Next, the characteristics of the first lens 810 to the fourth lens 840 will be described.

The first lens 810 may have a positive refractive power, and may have a convex object-side surface and a convex image-side surface. The second lens 820 may have both surfaces flat in the paraxial region. However, the second lens 820 may have a predetermined shape in the edge region. For example, an image-side surface of the second lens 820 may

TABLE 14

| Surface no. | S1 | S2 | S3 | S4 |
|---|---|---|---|---|
| K | 0.346147298 | 0 | 0 | −99 |
| A | 0.000111433 | −1.28869E−05 | 1.34543E−05 | −0.001515057 |
| B | 2.4303E−05 | −1.81856E−06 | 6.00481E−06 | 0.002042656 |
| C | −4.91391E−06 | −4.2526E−07 | 1.05529E−06 | −0.000863289 |
| D | 9.55881E−07 | −2.36854E−08 | 8.9499E−08 | 0.000207979 |
| E | −8.22735E−08 | 1.19892E−09 | 3.31007E−09 | −2.99399E−05 |
| F | 2.3328E−09 | 2.79722E−10 | −1.37479E−10 | 2.68261E−06 |
| G | −6.63203E−11 | 8.49567E−12 | −8.95816E−12 | −1.43864E−07 |
| H | 2.22429E−11 | −1.80349E−12 | 5.5113E−12 | 3.15857E−09 |
| J | −1.40881E−12 | −1.14414E−13 | 1.42386E−12 | 7.18113E−11 |

| Surface no. | S5 | S6 | S7 | S8 |
|---|---|---|---|---|
| K | −1.15E+01 | 0 | 0 | 5.482E−01 |
| A | −3.074E−03 | 1.74724E−05 | −8.29412E−05 | −1.318E−03 |
| B | 2.282E−03 | 7.40688E−06 | −8.54273E−06 | −5.821E−04 |
| C | −7.506E−04 | 2.35559E−06 | −1.45552E−06 | 1.008E−03 |
| D | 4.918E−05 | 4.31283E−07 | −1.97498E−07 | −7.730E−04 |
| E | 2.79835E−05 | 4.95361E−08 | −1.23807E−08 | 0.000310947 |
| F | −7.75548E−06 | 2.18715E−09 | 2.28462E−09 | −7.18098E−05 |
| G | 8.58096E−07 | −6.53368E−10 | 1.04878E−09 | 9.52805E−06 |
| H | −4.48245E−08 | −2.55752E−10 | 7.0285E−11 | −6.70126E−07 |
| J | 9.1035E−10 | −6.16238E−11 | 1.48618E−12 | 1.92406E−08 | be concave in the edge region. The third lens 830 may have a negative refractive power, and may have a convex object-side surface and a concave image-side surface. The fourth lens 840 may have a negative refractive power, and may have a convex object-side surface and a concave image-side surface.

Next, the prism P which is the optical path conversion member will be described. For reference, the prism described below is a type of the optical path conversion member described in the claims, and may be changed to another member.

The prism P may include a plurality of reflective surfaces. For example, the prism P may include a first reflective surface and a second reflective surface. The first reflective surface and the second reflective surface may be substantially parallel to each other. The first reflective surface and the second reflective surface may have a considerable distance therebetween. In an example, the distance from the first reflective surface to the second reflective surface may be greater than the height ImgHT of the imaging plane. In another example, the distance from the first reflective surface to the second reflective surface may be greater than four times the height ImgHT of the imaging plane.

The filter IF and the imaging plane IP may be disposed adjacent to the exit surface of the prism P.

The filter IF may block light of a specific wavelength. In an example, the filter IF according to this embodiment may block infrared light. However, a type of light blocked by the filter IF is not limited to the infrared light. In an example, the filter IF may block ultraviolet or visible light.

The imaging plane IP may be disposed at a point where light reflected from the prism P converges or forms an image, and may be formed by an image sensor IS or the like. In an example, the imaging plane IP may be formed on or inside the image sensor IS.

Figure 16:
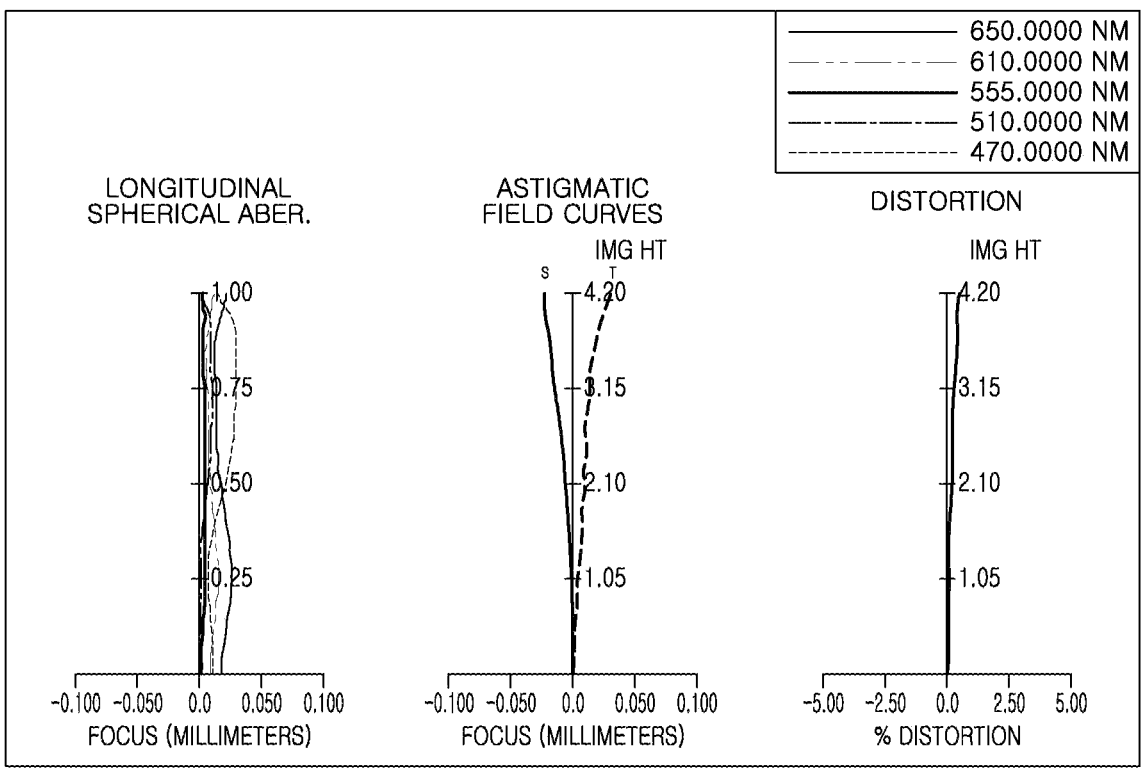
FIG. 16 illustrates an aberration curve of the example imaging lens system shown in FIG. 15.

The example imaging lens system 800 configured as above may show aberration characteristics shown in FIG. 16. Tables 15 and 16 below each show the lens characteristics and aspherical value of the imaging lens system according to this embodiment.

TABLE 15

| Surface no. | Component | Radius of curvature | Thickness/ Distance | Refractive index | Abbe number |
|---|---|---|---|---|---|
| S1 | First lens | 5.904 | 2.365 | 1.498 | 81.6 |
| S2 | | −174.092 | 0.621 | | |
| S3 | Second lens | Infinity | 0.378 | 1.667 | 20.3 |
| S4 | | Infinity | 0.143 | | |
| S5 | Third lens | 12.1578 | 0.583 | 1.570 | 37.3 |
| S6 | | 6.34693 | 0.300 | | |
| S7 | Fourth lens | 10.1574 | 0.726 | 1.537 | 55.7 |
| S8 | | 6.01581 | 1.200 | | |
| S9 | Prism | Infinity | 3.750 | 1.518 | 64.2 |
| S10 | | Infinity | 17.250 | 1.518 | 64.2 |
| S11 | | Infinity | 4.500 | 1.518 | 64.2 |
| S12 | | Infinity | 0.500 | | |
| S13 | Filter | Infinity | 0.210 | 1.518 | 64.2 |
| S14 | | Infinity | 0.396 | | |
| S15 | Imaging plane | Infinity | 0.006 | | |

TABLE 16

| Surface no. | S1 | S2 | S3 | S4 |
|---|---|---|---|---|
| K | 2.820E−01 | 0 | 0 | −9.90E+01 |
| A | −2.031E−05 | 2.100E−04 | 3.038E−04 | −1.928E−03 |
| B | 2.440E−05 | 1.139E−05 | 2.591E−05 | 2.015E−03 |
| C | −5.662E−06 | 5.672E−07 | 1.474E−06 | −8.633E−04 |
| D | 8.960E−07 | −1.214E−08 | 1.219E−07 | 2.082E−04 |
| E | −7.907E−08 | −3.999E−09 | 1.567E−08 | −2.992E−05 |
| F | 3.096E−09 | 8.350E−10 | 1.446E−09 | 2.684E−06 |
| G | −4.480E−11 | 3.426E−10 | −2.155E−12 | −1.439E−07 |
| H | 1.714E−11 | 4.004E−11 | −1.795E−11 | 3.128E−09 |
| J | −1.050E−12 | −6.117E−12 | 1.291E−12 | 5.687E−11 |

| Surface no. | S5 | S6 | S7 | S8 |
|---|---|---|---|---|
| K | −1.36E+01 | 0 | 0 | 2.154E−01 |
| A | −3.660E−03 | 9.396E−05 | −4.687E−05 | −1.991E−03 |
| B | 2.328E−03 | 2.322E−05 | −1.583E−05 | −2.357E−04 |
| C | −8.867E−04 | 2.025E−06 | −3.234E−06 | 6.081E−04 |
| D | 1.413E−04 | 1.411E−07 | −7.622E−07 | −5.128E−04 |
| E | −9.897E−07 | 2.232E−08 | −1.747E−07 | 2.160E−04 |
| F | −2.560E−06 | 3.858E−09 | −3.046E−08 | −5.164E−05 |
| G | 3.287E−07 | −6.133E−10 | −1.937E−09 | 7.050E−06 |
| H | −1.666E−08 | −6.082E−10 | 7.607E−10 | −5.070E−07 |
| J | 3.056E−10 | 1.552E−11 | 1.527E−10 | 1.479E−08 |

Tables 17 to 19 below each show the optical characteristic values and conditional expression values of the example imaging lens systems according to the above-described first to eighth embodiments.

TABLE 17

| Item | 1st embodiment | 2nd embodiment | 3rd embodiment | 4th embodiment |
|---|---|---|---|---|
| f | 18.089 | 18.003 | 18.001 | 18.001 |
| f1 | 6.019 | 8.329 | 9.493 | 9.798 |
| f2 | −19.484 | 22284.9 | −77.803 | −20.031 |
| f3 | 36.443 | −43.240 | −69.928 | 56.278 |
| f4 | −7.968 | −17.025 | −22.694 | −28.942 |
| TTL | 21.765 | 22.934 | 22.004 | 21.833 |
| BFL | 0.798 | 0.811 | 0.810 | 0.811 |
| PL | 17.000 | 17.000 | 17.000 | 17.000 |
| PD12 | 11.500 | 11.500 | 11.500 | 11.500 |
| F number | 4.500 | 3.600 | 3.700 | 3.800 |
| ImgHT | 2.800 | 2.100 | 2.100 | 2.100 |

| Item | 5th embodiment | 6th embodiment | 7th embodiment | 8th embodiment |
|---|---|---|---|---|
| f | 17.787 | 27.188 | 27.262 | 28.291 |
| f1 | 6.258 | 13.637 | 13.396 | 11.515 |
| f2 | −22.201 | 136.426 | 70.790 | — |
| f3 | −8.165 | 45.523 | 37.617 | −24.164 |
| f4 | 29.123 | −10.978 | −9.392 | −29.289 |
| TTL | 21.674 | 32.283 | 32.147 | 32.928 |
| BFL | 0.696 | 0.810 | 1.110 | 1.112 |
| PL | 17.000 | 25.500 | 25.500 | 25.500 |
| PD12 | 11.500 | 17.250 | 17.250 | 17.250 |
| F number | 4.400 | 4.400 | 4.400 | 4.400 |
| ImgHT | 2.800 | 4.200 | 4.200 | 4.200 |

TABLE 18

| Conditional expression | 1st embodiment | 2nd embodiment | 3rd embodiment | 4th embodiment |
|---|---|---|---|---|
| f/f1 | 3.005 | 2.161 | 1.896 | 1.837 |
| TTL/f | 1.203 | 1.274 | 1.222 | 1.213 |
| PL/TTL | 0.781 | 0.741 | 0.773 | 0.779 |
| PD12/f | 0.636 | 0.639 | 0.639 | 0.639 |

| Conditional expression | 5th embodiment | 6th embodiment | 7th embodiment | 8th embodiment |
|---|---|---|---|---|
| f/f1 | 2.842 | 1.994 | 2.035 | 2.457 |
| TTL/f | 1.219 | 1.187 | 1.179 | 1.164 |
| PL/TTL | 0.784 | 0.790 | 0.793 | 0.774 |
| PD12/f | 0.647 | 0.634 | 0.633 | 0.610 |

TABLE 19

| Conditional expression | 1st embodiment | 2nd embodiment | 3rd embodiment | 4th embodiment |
|---|---|---|---|---|
| f/PL | 1.0640 | 1.0590 | 1.0589 | 1.0589 |
| (|f1| + |f4|)/PL | 0.8228 | 1.4914 | 1.8934 | 2.2787 |
| (|f3| + |f4|)/PL | 2.6125 | 3.5449 | 5.4484 | 5.0129 |
| (|f1| + |f3| + |f4|)/PL | 2.9665 | 4.0349 | 6.0068 | 5.5892 |
| |f4/PL| | 0.4687 | 1.0014 | 1.3350 | 1.7024 |
| |R7/PL| | 0.8207 | 1.9252 | 0.2648 | 0.1755 |
| |R8/PL| | 0.2127 | 0.9195 | 0.1884 | 0.1357 |
| (R1 + R8)/PL | 0.4486 | 1.2387 | 0.4959 | 0.4668 |
| TL14/PL | 0.1746 | 0.2425 | 0.1879 | 0.1778 |
| ImgHT/PL | 0.1647 | 0.1235 | 0.1235 | 0.1235 |
| (TTL + ImgHT)/PL | 2.3443 | 2.4080 | 2.3533 | 2.3432 |
| (TTL + f)/PL | 1.4450 | 1.4726 | 1.4179 | 1.4079 |

TABLE 19-continued

| Conditional expression | 5th embodiment | 6th embodiment | 7th embodiment | 8th embodiment |
|---|---|---|---|---|
| f/PL | 1.0463 | 1.0662 | 1.0691 | 1.1094 |
| (|f1| + |f4|)/PL | 2.0812 | 0.9653 | 0.8937 | 1.6002 |
| (|f3| + |f4|)/PL | 2.1934 | 2.2158 | 1.8435 | 2.0962 |
| (|f1| + |f3| + |f4|)/PL | 2.5615 | 2.7505 | 2.3688 | 2.5478 |
| |f4/PL| | 1.7131 | 0.4305 | 0.3683 | 1.1486 |
| |R7/PL| | 0.1843 | 1.1330 | 2.6673 | 0.3983 |
| |R8/PL| | 0.2149 | 0.2147 | 0.2097 | 0.2359 |
| (R1 + R8)/PL | 0.4455 | 0.4428 | 0.4346 | 0.4675 |
| TL14/PL | 0.1752 | 0.1754 | 0.1701 | 0.2006 |
| ImgHT/PL | 0.1647 | 0.1647 | 0.1647 | 0.1647 |
| (TTL + ImgHT)/PL | 2.3213 | 2.3322 | 2.3297 | 2.4007 |
| (TTL + f)/PL | 1.4397 | 1.4307 | 1.4254 | 1.4560 |

Figure 17:
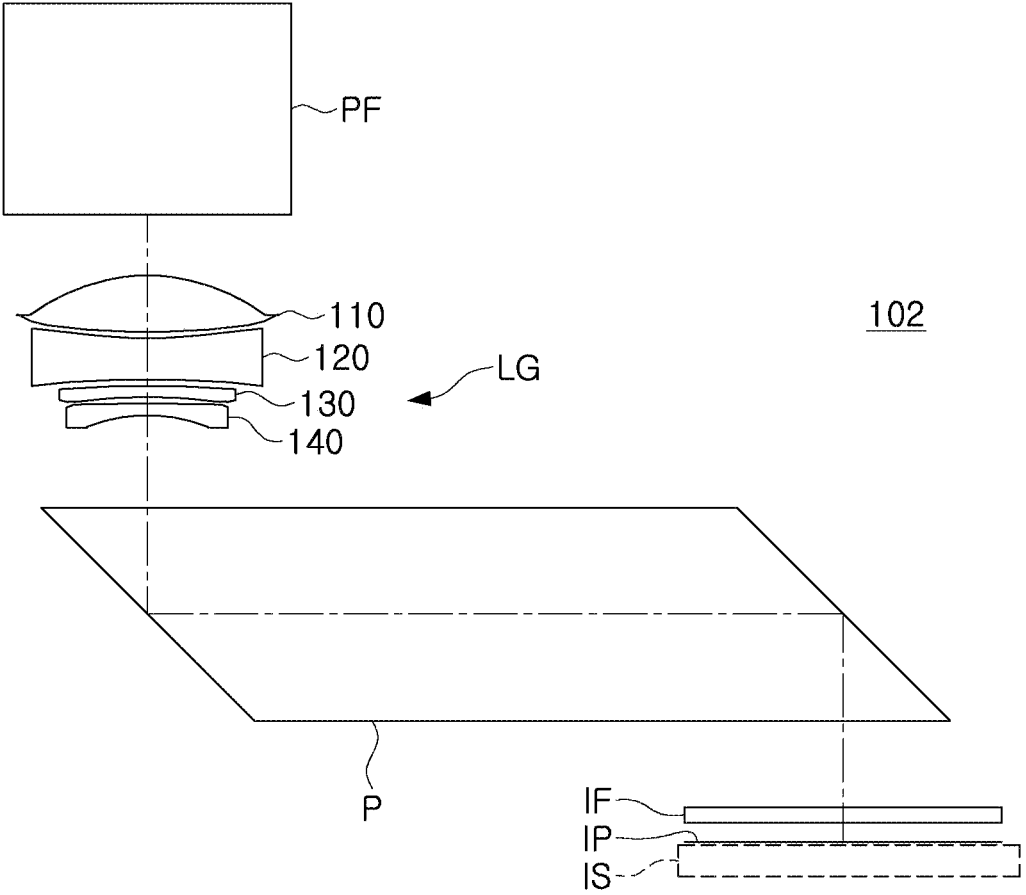
FIG. 17 illustrates a configuration diagram of a modification of the example imaging lens system.

Next, a modification of the example imaging lens system will be described with reference to FIG. 17.

Each of the example imaging lens systems according to the first to eighth embodiments may further include the optical path conversion member, if necessary. For example, an example imaging lens system 102 according to the modification may further include a prism PF disposed on an object side of the lens group LG, as shown in FIG. 17. The imaging lens system 102 configured as described above may be advantageous in reducing a thickness of the camera module.

Next, an example electronic device, in accordance with one or more embodiments, will be described with reference to FIG. 18.

The example electronic device according to the one or more embodiments may include the imaging lens system according to an example. In an example, the electronic device may include one or more of the example imaging lens systems according to a first embodiment to an eighth embodiment. As a specific example, the electronic device may include the imaging lens system 100 according to a first embodiment.

Figure 18:
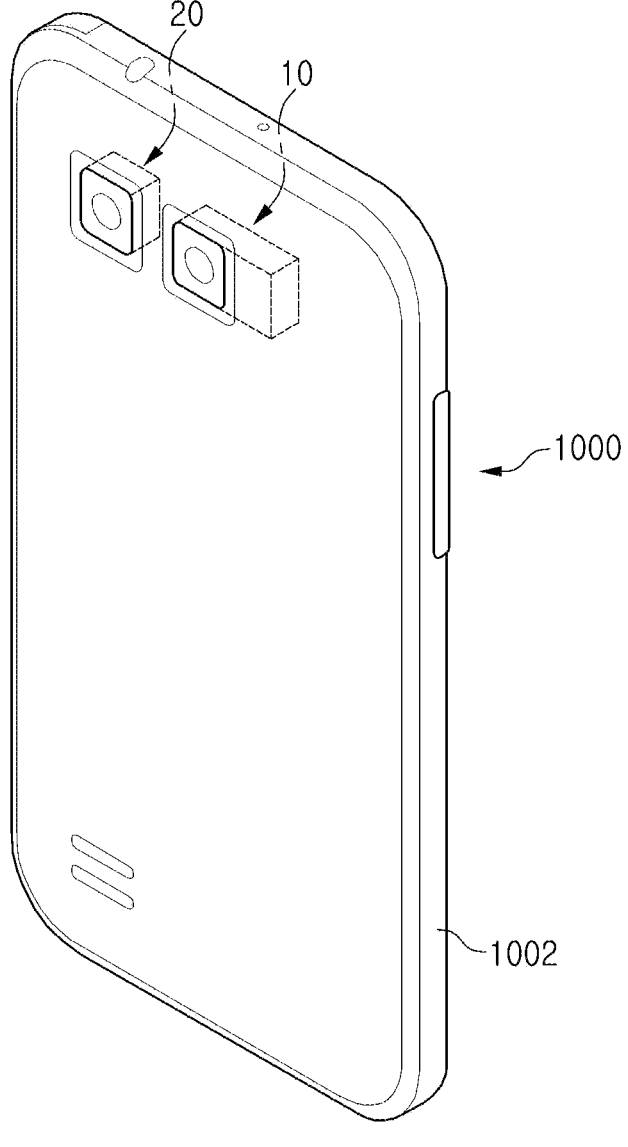
FIG. 18 illustrates a perspective view of an example electronic device, in accordance with one or more embodiments.

The example electronic device according to one or more embodiments may be a portable terminal 1000 as shown in FIG. 18. However, a type of the electronic device is not limited to the portable terminal 1000. In an example, the electronic device according to one or more embodiments may be, as only an example, a laptop computer.

The example portable terminal 1000 may include one or more camera modules 10 and 20. In a non-limited example, two camera modules 10 and 20 may be installed in a body 1002 of the portable terminal 1000 at a predetermined interval. In an example, the first camera module 10 and the second camera module 20 may capture an object in the same direction. For example, the first camera module 10 and the second camera module 20 may be installed on one surface of the electronic device 1000.

At least one of the first camera module 10 and the second camera module 20 may include the example imaging lens system according to one of the first to fourth embodiments. For example, the first camera module 10 may include the example imaging lens system 100 according to a first embodiment.

In an example, the first camera module 10 may capture an image of an object disposed at a long distance. In other words, in an example, a focal length of the first camera module 10 may be greater than a focal length of the second camera module 20.

As set forth above, the one or more examples may provide an imaging lens system which may be mounted in a small terminal or a thin terminal.

Additionally, the one or more examples may provide a camera module having a telephoto imaging lens system.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. An imaging lens system, comprising:
a first lens, a second lens, a third lens, a fourth lens, and an optical path conversion member sequentially disposed from an object side toward an imaging plane,
wherein the imaging lens system comprises a total of four lenses,
wherein the first lens has a convex image-side surface,
wherein the fourth lens has negative refractive power, a convex object-side surface in a paraxial region, and a concave image-side surface in a paraxial region, and
wherein $0.70 < PL/TTL < 0.90$,
where PL is a distance from an incident surface of the optical path conversion member to an exit surface of the optical path conversion member, and TTL is a distance from an object-side surface of the first lens to the imaging plane.

2. The imaging lens system of claim 1, wherein the first lens has a convex object-side surface.

3. The imaging lens system of claim 1, wherein the second lens has a concave object-side surface.

4. The imaging lens system of claim 1, wherein the second lens has a concave image-side surface.

5. The imaging lens system of claim 1, wherein the third lens has a convex object-side surface.

6. The imaging lens system of claim 1, wherein the third lens has a concave image-side surface.

* * * * *